(12) United States Patent
Asanuma et al.

(10) Patent No.: US 8,443,592 B2
(45) Date of Patent: May 21, 2013

(54) EXHAUST PURIFICATION SYSTEM OF INTERNAL COMBUSTION ENGINE

(75) Inventors: Takamitsu Asanuma, Mishima (JP);
Hiromasa Nishioka, Susono (JP);
Daichi Imai, Susono (JP); Yuka Nakata, Susono (JP); Kazuhiro Umemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/265,713

(22) PCT Filed: May 18, 2009

(86) PCT No.: PCT/JP2009/059472
§ 371 (c)(1),
(2), (4) Date: Oct. 21, 2011

(87) PCT Pub. No.: WO2010/134203
PCT Pub. Date: Nov. 25, 2010

(65) Prior Publication Data
US 2012/0055143 A1     Mar. 8, 2012

(51) Int. Cl.
*F01N 3/10*     (2006.01)

(52) U.S. Cl.
USPC .............. 60/301; 602/274; 602/285; 602/299; 602/276; 423/196 A

(58) Field of Classification Search
USPC .................................... 60/274–324
See application file for complete search history.

(56) References Cited

U.S. PATENT DOCUMENTS

| 6,129,835 | A  | * | 10/2000 | Lesieur et al. ............ 208/208 R |
| 6,749,754 | B1 |   | 6/2004  | Holder et al. |
| 7,410,585 | B2 | * | 8/2008  | Rohrbach et al. ............ 210/633 |
| 8,216,461 | B2 | * | 7/2012  | Tabb et al. ................. 210/198.1 |
| 2002/0028505 | A1 |   | 3/2002 | Sakai et al. |
| 2005/0109021 | A1 | * | 5/2005 | Noirot et al. ..................... 60/295 |
| 2005/0169826 | A1 | * | 8/2005 | Li et al. ..................... 423/244.06 |
| 2005/0236334 | A1 |   | 10/2005 | Rohrbach et al. |

FOREIGN PATENT DOCUMENTS

| JP | A-2000-3298   | 11/2000 |
| JP | A-2000-314309 | 11/2000 |
| JP | A-2002-161285 | 6/2002 |
| JP | A-2007-529687 | 10/2007 |
| JP | A-2009-18603  | 1/2009 |

OTHER PUBLICATIONS

International Search Report issued in International Application No. PCT/JP2009/059472 dated Jul. 14, 2009 (with translation).

* cited by examiner

*Primary Examiner* — Thomas Denion
*Assistant Examiner* — Jesse Bogue
(74) *Attorney, Agent, or Firm* — Oliff & Berridge, PLC

(57) ABSTRACT

An exhaust purification system is provided with an $NO_x$ storage reduction catalyst arranged in an exhaust passage and an $SO_x$ trap material arranged upstream of the $NO_x$ storage reduction catalyst and removes $SO_x$ contained in exhaust gas. A main flow path has a secondary flow path connected to it. In the secondary flow path, a removal device is arranged for removing the sulfur constituent contained in fuel. The secondary flow path includes an opening and closing device. When the $SO_x$ removal rate of the $SO_x$ trap material becomes a predetermined removal rate judgment value or less or the concentration of the $SO_x$ which flows into the $SO_x$ trap material becomes a predetermined concentration judgment value or more, at least part of the fuel flowing through a main flow path is made to flow into the secondary flow path and run through the removal device.

9 Claims, 11 Drawing Sheets

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust gas of a diesel engine, gasoline engine, or other internal combustion engine, for example, contains carbon monoxide (CO), unburned fuel (HC), nitrogen oxides ($NO_x$), particulate matter (PM), or other constituents. The internal combustion engine has an exhaust purification system attached to it to remove these constituents.

As one method for removing nitrogen oxides, it has been proposed that an $NO_x$ storage reduction catalyst be arranged in an engine exhaust passage. An $NO_x$ storage reduction catalyst stores $NO_x$ when an air-fuel ratio of exhaust gas is lean. When a stored amount of $NO_x$ reaches an allowable amount, the air-fuel ratio of the exhaust gas is made rich or a stoichiometric air-fuel ratio so that the stored $NO_x$ is released. The released $NO_x$ is reduced by a reducing agent, such as the carbon monoxide, etc., which is contained in the exhaust gas.

The exhaust gas of an internal combustion engine sometimes contains sulfur oxides ($SO_x$). An $NO_x$ storage reduction catalyst stores $SO_x$ simultaneously with storing $NO_x$. If $SO_x$ is stored, the storable amount of $NO_x$ falls. In this case, in the $NO_x$ storage reduction catalyst, so-called "sulfur poisoning" occurs.

To keep an $NO_x$ storage reduction catalyst from storing $SO_x$, there is known an exhaust purification system which arranges at an upstream side of the $NO_x$ storage reduction catalyst an $SO_x$ trap catalyst which has a function of removing the $SO_x$.

Japanese Patent Publication (A) No. 2000-314309 discloses an exhaust purification system of an internal combustion engine which is provided with a storage reduction type $NO_x$ catalyst provided in an exhaust passage of a lean combustion type internal combustion engine, an $SO_x$ trap material which is provided at an upstream side of the storage reduction type $NO_x$ catalyst and in the vicinity of the internal combustion engine, a bypass passage which guides exhaust gas at an upstream side of the storage reduction type $NO_x$ catalyst to a downstream side of the storage reduction type $NO_x$ catalyst, and means for switching between the bypass passage and an exhaust pipeline to the storage reduction type $NO_x$ catalyst.

CITATION LIST

Patent Literature

PLT 1: Japanese Patent Publication (A) No. 2000-314309

SUMMARY OF INVENTION

Technical Problem

As an $SO_x$ trap material for removing $SO_x$ which is contained in exhaust gas, for example, it is possible to employ an $SO_x$ trap catalyst which is comprised of an $SO_x$ absorption layer able to absorb $SO_x$ arranged on a surface of a substrate and which has a catalyst metal which promotes an oxidation reaction of $SO_x$. Here, an $SO_x$ trap material sometimes falls in ability to remove $SO_x$ depending on the operating state of the internal combustion engine. That is, sometimes the $SO_x$ removal rate falls. For example, an $SO_x$ trap catalyst has as activation temperature. In a temperature region below this activation temperature, the $SO_x$ removal rate falls.

The $SO_x$ which could not be trapped at the $SO_x$ trap material flows out from the $SO_x$ trap catalyst. The $SO_x$ which flows out from the $SO_x$ trap material ends up being stored at the $NO_x$ storage reduction catalyst which is arranged downstream of the $SO_x$ trap material. For this reason, sometimes sulfur poisoning of the $NO_x$ storage reduction catalyst occurs and the $NO_x$ purifying ability of the $NO_x$ storage reduction catalyst falls.

In this case, since an $SO_x$ trap material is arranged to remove the $SO_x$, in an operating state where the $SO_x$ removal rate becomes smaller, sometimes part of the $SO_x$ ends up passing straight through the $SO_x$ trap catalyst.

The present invention has as its object the provision of an exhaust purification system of an internal combustion engine which is provided with an $SO_x$ trap material and which suppresses the outflow of $SO_x$ from the $SO_x$ trap material.

Solution to Problem

A first exhaust purification system of an internal combustion engine of the present invention is provided with an $NO_x$ storage reduction catalyst which is arranged in an engine exhaust passage, which stores $NO_x$ which is contained in the exhaust gas when an air-fuel ratio of inflowing exhaust gas is lean, and which releases stored $NO_x$ when the air-fuel ratio of the inflowing exhaust gas becomes a stoichiometric air-fuel ratio or rich and is provided with an $SO_x$ trap material which is arranged in the engine exhaust passage upstream of the $NO_x$ storage reduction catalyst and which removes $SO_x$ which is contained in the exhaust gas. A main flow path which feeds fuel to combustion chambers of the engine body has connected to it a secondary flow path which bypasses the main flow path, while the secondary flow path has arranged in it a removal device which removes the sulfur constituent which is contained in the fuel and has arranged in it an opening and closing device which opens and closes the secondary flow path. When an $SO_x$ removal rate of the $SO_x$ trap material becomes a predetermined removal rate judgment value or less or when a concentration of the $SO_x$ which flows into the $SO_x$ trap material becomes a predetermined concentration judgment value or more, at least part of the fuel which flows through the main flow path is made to flow into the secondary flow path and run through the removal device.

In the above invention, the case when an $SO_x$ removal rate of the $SO_x$ trap material becomes a predetermined removal rate judgment value or less includes at least one case of a case when a temperature of the $SO_x$ trap material becomes a low temperature side predetermined low temperature judgment value or less, a case when a temperature of the $SO_x$ trap material becomes a high temperature side predetermined high temperature judgment value or more, a case when an air-fuel ratio of the exhaust gas which flows into the $SO_x$ trap material becomes a predetermined air-fuel ratio judgment value or less, a case when a spatial velocity of the exhaust gas which flows into the $SO_x$ trap material becomes a predetermined velocity judgment value or more, and a case when an $SO_x$ stored amount of the $SO_x$ trap material becomes a predetermined stored amount judgment value or more.

In the above invention, the case when a concentration of the $SO_x$ which flows into the $SO_x$ trap material becomes a predetermined concentration judgment value or more includes a case when a content of a sulfur constituent which is contained in the fuel which is fed to the combustion chambers is a predetermined content judgment value or more.

In the above invention, it is preferable to close the secondary flow path when the lubrication performance which is demanded by a fuel injector which injects fuel into a combustion chamber becomes high.

In the above invention, the case when the lubrication performance which is demanded by a fuel injector which injects fuel into a combustion chamber becomes high includes at least one of a case when an injection frequency of fuel in one fuel cycle is a predetermined injection frequency judgment value or more and a case when an injection pressure of fuel from the fuel injector is a predetermined pressure judgment value or more.

A second exhaust purification system of an internal combustion engine of the present invention is provided with an $NO_x$ storage reduction catalyst which is arranged in an engine exhaust passage, which stores $NO_x$ which is contained in exhaust gas when an air-fuel ratio of inflowing exhaust gas is lean, and which releases stored $NO_x$ when the air-fuel ratio of the inflowing exhaust gas becomes a stoichiometric air-fuel ratio or rich and is provided with an $SO_x$ trap material which is arranged in the engine exhaust passage upstream of the $NO_x$ storage reduction catalyst and which removes the $SO_x$ which is contained in the exhaust gas. In an engine body, a main flow path which circulates lubrication oil of the engine body has connected to it a secondary flow path which bypasses the main flow path, while the secondary flow path has arranged in it a removal device which removes the sulfur constituent which is contained in the lubrication oil and has arranged in it an opening and closing device which opens and closes the secondary flow path. When an $SO_x$ removal rate of the $SO_x$ trap material becomes a predetermined removal rate judgment value or less or when a concentration of the $SO_x$ which flows into the $SO_x$ trap material becomes a predetermined concentration judgment value or more, at least part of the lubrication oil which flows through the main flow path is made to flow into the secondary flow path and run through the removal device.

In the above invention, the case when the $SO_x$ removal rate of the $SO_x$ trap material becomes the predetermined removal rate judgment value or less includes at least one case of a case when a temperature of the $SO_x$ trap material becomes a low temperature side predetermined low temperature judgment value or less, a case when a temperature of the $SO_x$ trap material becomes a high temperature side predetermined high temperature judgment value or more, a case when an air-fuel ratio of the exhaust gas which flows into the $SO_x$ trap material becomes a predetermined air-fuel ratio judgment value or less, a case when a spatial velocity of the exhaust gas which flows into the $SO_x$ trap material becomes a predetermined velocity judgment value or more, and a case when an $SO_x$ stored amount of the $SO_x$ trap material becomes a predetermined stored amount judgment value or more.

In the above invention, the case when a concentration of the $SO_x$ which flows into the $SO_x$ trap material becomes a predetermined concentration judgment value or more includes a case when a content of the sulfur constituent which is contained in the lubrication oil becomes a predetermined content judgment value or more.

In the above invention, it is preferable to close the secondary flow path when a lubrication performance demanded in a component of the engine body becomes high.

In the above invention, the case when a lubrication performance demanded in a component of the engine body becomes high includes at least one of a case where a speed of the engine body becomes a predetermined speed judgment value or more and a case where a temperature of the engine body becomes at predetermined temperature judgment value or less.

Advantageous Effects of Invention

According to the present invention, it is possible to provide an exhaust purification system of an internal combustion engine which is provided with an $SO_x$ trap material and which suppresses an outflow of $SO_x$ from the $SO_x$ trap material.

DESCRIPTION OF EMBODIMENTS

First Embodiment

Referring to FIG. 1 to FIG. 8, an exhaust purification system of an internal combustion engine in a first embodiment will be explained. The internal combustion engine in the present embodiment is arranged in a motor vehicle. In the present embodiment, the explanation will be given taking as an example a compression ignition type of diesel engine which is mounted in an automobile.

Figure 1:
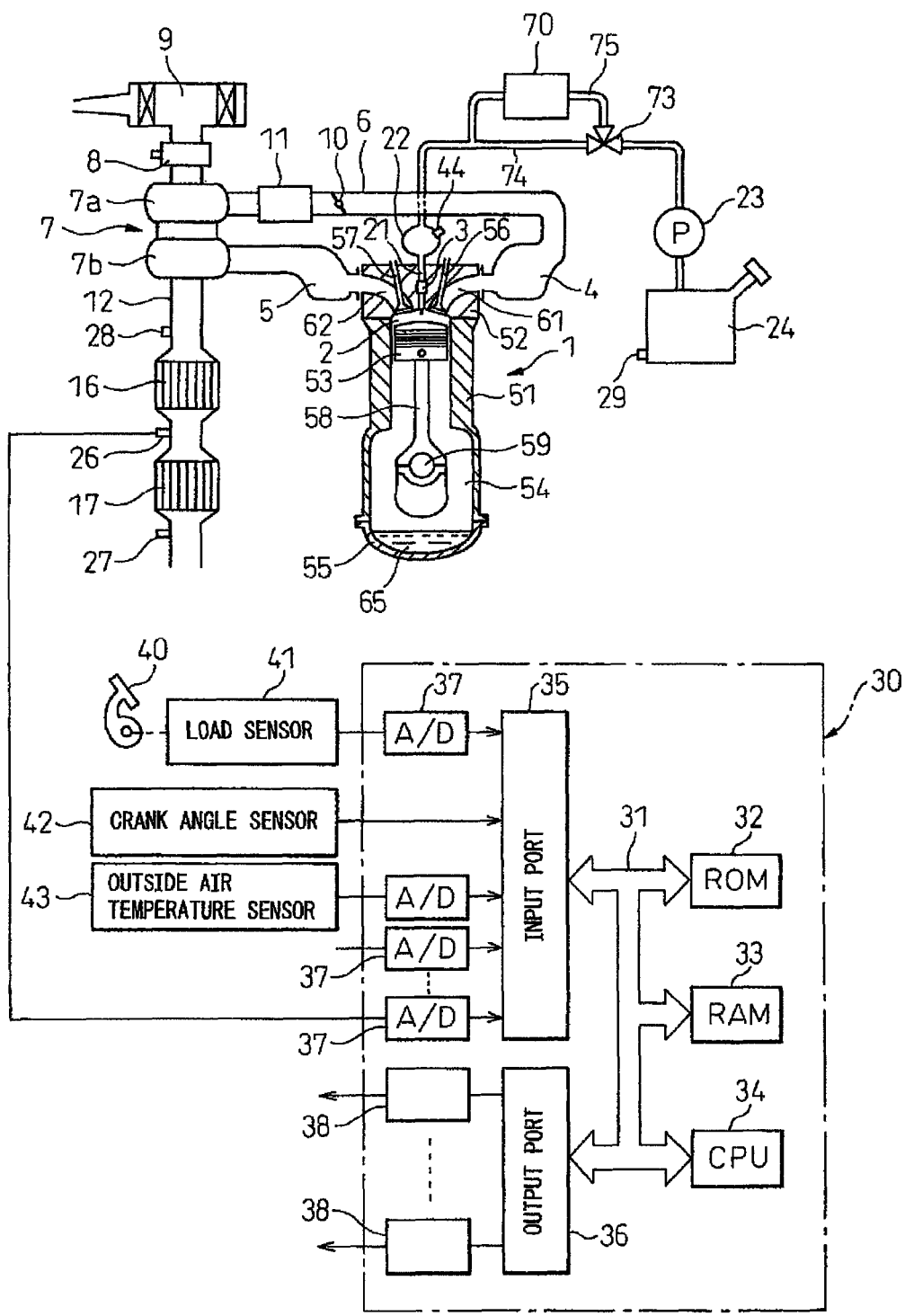
FIG. 1 is a schematic view of an internal combustion engine in a first embodiment.

FIG. 1 is a schematic view of an internal combustion engine in the present embodiment. The internal combustion engine is provided with an engine body 1. Further, the internal combustion engine is provided with an exhaust purification system which purifies the exhaust gas. The engine body 1 is provided with a cylinder block 51 and a cylinder head 52. Inside of the cylinder block 51, pistons 53 are arranged. The pistons 53 are arranged to be able to reciprocate inside of the cylinder block 51. A space surrounded by a piston 53, the cylinder block 51, and the cylinder head 52 forms a cylinder constituted by a combustion chamber 2.

At the cylinder head 52, a fuel injector 2 is arranged for injecting fuel into each combustion chamber 2. The fuel injector 3 in the present embodiment is an electronically controlled type. The cylinder head 52 is formed with intake ports 61. Each intake port 61 is opened and closed by an intake valve

56. The intake ports 61 are connected to an intake manifold 4. The cylinder head 52 is formed with exhaust ports 62. Each exhaust port 62 is opened and closed by an exhaust valve 57. The exhaust ports 62 are connected to an exhaust manifold 5.

The cylinder block 51 has a crank case 54 in which a crankshaft 59 is arranged. The pistons 53 are connected through a connecting rod 58 to the crankshaft 59. The reciprocating motions of the pistons 53 are transmitted through the connecting rod 58 to the crankshaft 59 whereby they are converted to rotational motion. At the bottom side of the cylinder block 51, an oil pan 55 is arranged. Inside of the oil pan 55, lubrication oil 65 is stored for lubricating the components of the engine body 1.

The intake manifold 4 is connected through an intake duct 6 to an outlet of a compressor 7a of an exhaust turbocharger 7. An inlet of the compressor 7a is connected through an intake air detector 8 to an air cleaner 9. Inside of the intake duct 6, a throttle valve 10 which is driven by a step motor is arranged. Furthermore, at the intake duct 6, a cooling device 11 is arranged for cooling the intake air which flows through the inside of the intake duct 6. In the embodiment shown in FIG. 1, engine cooling water is guided to the cooling device 11. The engine cooling water is used to cool the intake air. The exhaust manifold 5 is a space where the exhaust gases which are exhausted from the different combustion chambers 2 converge. The exhaust manifold 5 is connected to the inlet of the turbine 7b of the exhaust turbocharger 7.

The exhaust purification system in the present embodiment is provided with an $SO_x$ trap material which removes the $SO_x$ which is contained in exhaust gas, that is, an $SO_x$ trap catalyst 16. The $SO_x$ trap catalyst 16 is connected to an outlet of the turbine 7b through an exhaust pipe 12. The exhaust purification system in the present embodiment is provided with an $NO_x$ storage reduction catalyst (NSR) 17. The $NO_x$ storage reduction catalyst 17 is arranged in the engine exhaust passage downstream of the $SO_x$ trap catalyst 16.

Inside of the engine exhaust passage downstream of the $NO_x$ storage reduction catalyst 17, a particulate filter for trapping particulate matter in the exhaust gas and an oxidation catalyst for oxidizing the carbon monoxide and unburned fuel are arranged (not shown). Further, between the exhaust manifold 5 and the intake manifold 4, an EGR passage for performing exhaust gas recirculation (EGR) is arranged (not shown). In the EGR passage, an electronically controlled type EGR control valve is arranged. The EGR control valve is used to regulate the flow rate of the exhaust gas running through the EGR passage.

The internal combustion engine in the present embodiment is provided with a fuel feed system which feeds fuel which is stored in a fuel tank 24 to the combustion chambers 2 of the engine body 1. The fuel injectors 3 are connected through fuel feed tubes 21 to a common rail 22. The fuel feed tubes 21 are formed for the respective combustion chambers 2 and are connected to a single common rail 22. The common rail 22 is connected through an electronic control type variable discharge fuel pump 23 to the fuel tank 24. The fuel which is stored in the fuel tank 24 is fed by a fuel pump 23 to the inside of the common rail 22. The fuel which is fed into the common rail 22 is fed through the respective fuel feed tubes 21 to the fuel injectors 3.

The electronic control unit 30 is comprised of a digital computer. The electronic control unit 30 in the present embodiment functions as a control device for the exhaust purification system. The electronic control unit 30 includes components connected to each other through a bidirectional bus 31 such as a ROM (read only memory) 32, RAM (random access memory) 33, CPU (microprocessor) 34, input port 35, and output port 36.

The ROM 32 is a storage device for exclusive reading from. The ROM 32 stores in advance maps and other information required for control. The CPU 34 can perform various computations and judgments. The RAM 33 is a storage device which can be written into. The RAM 33 can store information such as the operating history and can temporarily store results of processing.

In the engine exhaust passage downstream of the $SO_x$ trap catalyst 16, a temperature sensor 26 is arranged for detecting a temperature of the $SO_x$ trap catalyst 16. Downstream of the $NO_x$ storage reduction catalyst 17, a temperature sensor 27 is arranged for detecting a temperature of the $NO_x$ storage reduction catalyst 17. Upstream of the $SO_x$ trap catalyst 16, an air-fuel ratio sensor 28 is arranged for detecting the air-fuel ratio of the exhaust gas flowing into the $SO_x$ trap catalyst 16.

Further, in the fuel feed system, the fuel tank 24 has a sulfur concentration sensor 29 arranged at it to detect the concentration of the sulfur constituent in the fuel. The common rail 22 has a pressure sensor 44 arranged at it to detect the pressure of the fuel which is injected from the fuel injectors 3. The output signals of these temperature sensors 26 and 27 and intake air detector 8 are input through the corresponding AD converters 37 to the input port 35. Further, the output signals of the air-fuel ratio sensor 28, sulfur concentration sensor 29, and pressure sensor 44 are input through the corresponding AD converters 37 to the input port 35.

The accelerator pedal 40 has a load sensor 41 connected to it to generate output voltage which is proportional to an amount of depression of the accelerator pedal 40. An output voltage of the load sensor 41 is input through a corresponding AD converter 37 to the input port 35. Furthermore, the input port 35 has a crank angle sensor 42 connected to it for generating an output pulse every time the crankshaft rotates by for example 15°. The output of the crank angle sensor 42 can be used to detect the speed of the engine body 1. Furthermore, an outside air temperature sensor 43 is attached to the chassis for measuring the air temperature around the vehicle. The output of the outside air temperature sensor 43 is input through a corresponding AD converter 37 to the input port 35.

On the other hand, the output port 36 is connected through corresponding drive circuits 38 to the fuel injectors 3, a step motor for driving the throttle valve 10, EGR control valve, and fuel pump 23. In this way, the fuel injectors 3 and throttle valve 10 etc. are controlled by the electronic control unit 30.

The fuel feed system includes a main flow path 74 for feeding fuel to the fuel injectors 3. The main flow path 74 extends from the fuel tank 24 to the fuel injectors 3. In the main flow path 74, the common rail 22 is arranged. In the middle of the main flow path 74, a secondary flow path 75 is connected which bypasses part of the main flow path 74. The fuel feed system includes a switching valve 73 as an opening and closing device which opens and closes the secondary flow path 75. The opening and closing device is formed so as to be able to cut or restart the flow of fuel to the secondary flow path. That is, the opening and closing device is formed so as to open and close the secondary flow path 75.

The switching valve 73 in the present embodiment is formed so as to switch the flow of fuel between the main flow path 74 and the secondary flow path 75. Due to the switching valve 73, all of the fuel which flows out from the fuel pump 23 passes through the main flow path 74 and is fed to the combustion chambers 2. Alternatively, all of the fuel which flows out from the fuel pump 23 passes through the secondary flow path 75 and is fed to the combustion chambers 2. The switching valve 73 is connected through the corresponding drive circuit 38 to the output port of the electronic control unit 30. The switching valve 73 is controlled by the electronic control unit 30.

The exhaust purification system of an internal combustion engine in the present embodiment is provided with a removal device 70 which removes the sulfur constituent contained in the fuel. The removal device 70 is provided in the secondary flow path 75. The removal device 70 in the present embodiment includes a sulfur compound adsorbent which adsorbs a compound of a sulfur constituent, that is, a sulfur compound. The removal device 70 removes the sulfur compound by adsorption. As the sulfur compound adsorbent, for example, a mesoporous silica porous body, zeolite, acidic clay, activated clay, etc. may be used.

Further, the removal device 70 may include an oxidizing agent or oxidation catalyst for oxidizing the sulfur compound adsorbed at the sulfur compound adsorbent and a sulfate compound adsorbent for causing adsorption of a sulfate compound produced due to oxidation. By converting the sulfur compound to a sulfate compound for adsorption, the removal rate of the sulfur constituent is raised. As the oxidizing agent, titanium oxide ($TiO_2$), nickel oxide (NiO), manganese dioxide ($MNO_2$), or other metal oxide-based substance can be used. As the oxidation catalyst, a platinum or nickel or other metal catalyst may be used. As the adsorbent of the sulfate compound, activated clay, or zeolite, etc. may be used.

The removal device which removes the sulfur constituent is not limited to this. It is possible to employ any device which can remove a sulfur constituent.

Figure 2:
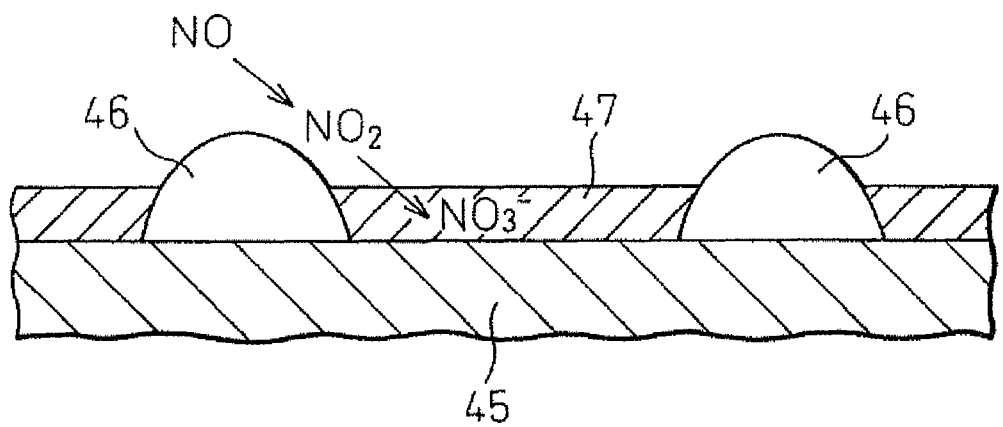
FIG. 2 is an enlarged schematic cross-sectional view of an $NO_x$ storage reduction catalyst.

FIG. 2 shows an enlarged schematic cross-sectional view of an $NO_x$ storage reduction catalyst. The $NO_x$ storage reduction catalyst 17 is a catalyst which temporarily stores $NO_x$ which is contained in exhaust gas exhausted from the engine body 1 and converts it to $N_2$ when releasing the stored $NO_x$.

The $NO_x$ storage reduction catalyst 17 is comprised of a substrate on which for example a catalyst carrier 45 comprised of alumina is formed. On the surface of the catalyst carrier 45, a catalyst metal 46 formed by a precious metal is carried dispersed. On the surface of the catalyst carrier 45, a layer of an $NO_x$ absorbent 47 is formed. As the catalyst metal 46, for example, platinum (Pt) is used. As the constituents forming the $NO_x$ absorbent 47, for example, at least one constituent selected from potassium (K), sodium (Na), cesium (Cs), or other such alkali metal, barium (Ba), calcium (Ca), or other such alkali earth, or lanthanum (La), yttrium (Y), or other such rare earth is used. In the present embodiment, as the constituent forming the $NO_x$ absorbent 47, barium Ba is used.

In the present invention, the ratio of the air and fuel (hydrocarbons) in the exhaust gas which is supplied to the engine intake passage, combustion chambers, or engine exhaust passage is called the "air-fuel ratio of the exhaust gas (A/F)". When the air-fuel ratio of the exhaust gas is lean (when larger than the stoichiometric air-fuel ratio), the NO contained in the exhaust gas is oxidized on the catalyst metal 46 and becomes $NO_2$. $NO_2$ is stored in the form of nitrate ions $NO_3^-$ in the $NO_x$ absorbent 47. As opposed to this, when the air-fuel ratio of the exhaust gas is rich or if it becomes the stoichiometric air-fuel ratio, the nitrate ions $NO_3^-$ which are stored in the $NO_x$ absorbent 47 are released in the form of $NO_2$ from the $NO_x$ absorbent 47. The released $NO_x$ is reduced to $N_2$ by the unburned hydrocarbons, carbon monoxide, etc. contained in the exhaust gas. When the storable amount of $NO_x$ of the $NO_x$ storage reduction catalyst 17 decreases, the air-fuel ratio of the exhaust gas flowing into the $NO_x$ storage reduction catalyst is made the stoichiometric air-fuel ratio or rich to make the $NO_x$ storage reduction catalyst 17 release the $NO_x$ in "$NO_x$ release control".

Exhaust gas contains $SO_x$, that is, $SO_2$. If the $SO_x$ flows into the $NO_x$ storage reduction catalyst 17, it is stored in the same way as $NO_x$ in the $NO_x$ storage reduction catalyst 17. $SO_x$ is stored in the form of the sulfate $BaSO_4$ in the $NO_x$ storage reduction catalyst. In $NO_x$ release control, if just making the air-fuel ratio of the exhaust gas the stoichiometric air-fuel ratio or rich, the sulfate $BaSO_4$ will not break down but will remain as is. For this reason, the amount of $NO_x$ which the $NO_x$ storage reduction catalyst can store will fall. In this case, the $NO_x$ storage reduction catalyst suffers from sulfur poisoning.

Figure 3:
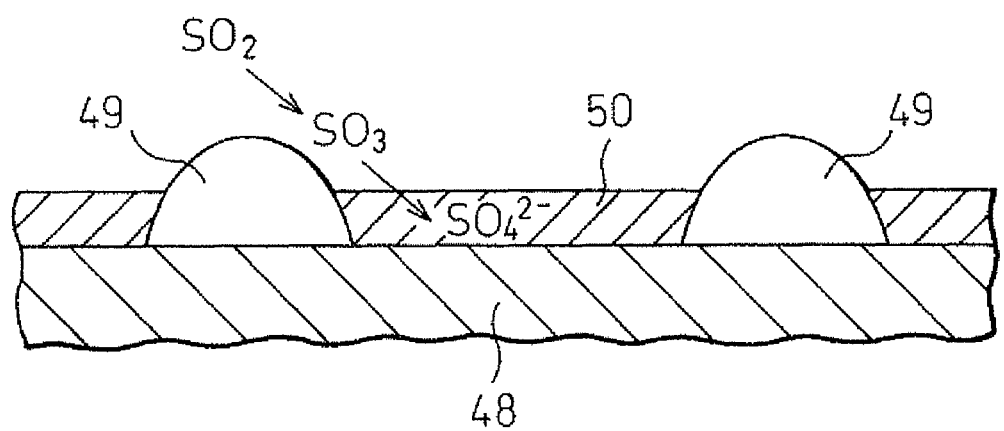
FIG. 3 is an enlarged schematic cross-sectional view of an $SO_x$ trap catalyst.

FIG. 3 shows an enlarged schematic cross-sectional view of an $SO_x$ trap catalyst. The $SO_x$ trap material constituted by the $SO_x$ trap catalyst 16 stores the $SO_x$ which is contained in the exhaust gas exhausted from the engine body 1 and thereby removes the $SO_x$ from the exhaust gas. The $SO_x$ trap catalyst 16 in the present embodiment has a configuration similar to the $NO_x$ storage reduction catalyst 17.

The $SO_x$ trap catalyst 16 is comprised of a substrate on which for example a catalyst carrier 48 comprised of alumina is formed. On the surface of the catalyst carrier 48, a catalyst metal 49 is carried dispersed. On the surface of the catalyst carrier 45, a layer of an $SO_x$ absorbent 50 is formed. In the present embodiment, the catalyst metal 49 used is, among the base metals, iron Fe. As the catalyst metal 49, in addition to a base metal, platinum, silver, or another precious metal may also be used. As the constituents forming the $SO_x$ absorbent 50, for example, at least one constituent selected from potassium (K), sodium (Na), cesium (Cs), or other such alkali metal, barium (Ba), calcium (Ca), or other such alkali earth, or lanthanum (La), yttrium (Y), or other such rare earth is used. In the present embodiment, as the constituent forming the $SO_x$ absorbent 50, barium Ba is used.

If $SO_2$ flows into the $SO_x$ trap catalyst 16, it is oxidized at the catalyst metal 49 and becomes $SO_3$. This $SO_3$ is adsorbed at the $SO_x$ absorbent 50 whereby for example the sulfate $BaSO_4$ is produced. In this case, the $SO_x$ trap catalyst 16 can trap the $SO_x$ which is contained in the exhaust gas. The trapped $SO_x$ can be stored at the $SO_x$ absorbent 50.

The $SO_x$ trap material is not limited to this embodiment. It may also be formed to remove the $SO_x$ which is contained in the exhaust gas.

The $SO_x$ trap catalyst 16 in the present embodiment is similar in configuration to the $NO_x$ storage reduction catalyst 17, so stores not only $SO_x$, but also $NO_x$. The $NO_x$ which is stored in the $SO_x$ absorbent 50 is simultaneously released at the time of $NO_x$ release control of the $NO_x$ storage reduction catalyst 17. That is, by making the air-fuel ratio of the exhaust gas the stoichiometric air-fuel ratio or rich, $NO_x$ is released from the $SO_x$ trap catalyst. The released $NO_x$ is reduced to $N_2$. In this regard, sulfate $BaSO_4$ is stable, so even if performing $NO_x$ release control, $SO_x$ remains in the $SO_x$ trap catalyst. If continuing to use the $SO_x$ trap catalyst, the $SO_x$ stored amount gradually increases.

The $SO_x$ trap catalyst in the present embodiment uses a base metal as the catalyst metal. A catalyst metal of a base metal has a weaker oxidation ability compared with a catalyst metal of a precious metal. However, $SO_x$ is more easily absorbed at the $SO_x$ absorbent 50 than the $NO_x$. For this reason, the $SO_x$ trap catalyst can be configured using a catalyst metal with a relatively small oxidation ability like a base metal. When using a metal with a relatively small oxidation ability as the catalyst metal, when the $SO_x$ stored amount is small, $NO_x$ is stored together with the $SO_x$. However, if the $SO_x$ stored amount increases, the storage ability of $NO_x$ gradually falls and $SO_x$ can be stored on a priority basis.

By arranging an $SO_x$ trap catalyst in the engine exhaust passage, it is possible to remove the $SO_x$ which is contained in the exhaust gas. By arranging an $SO_x$ trap material at the upstream side of the $NO_x$ storage reduction catalyst, it is possible to suppress the flow of $SO_x$ to the $NO_x$ storage reduction catalyst. That is, it is possible to suppress sulfur poisoning of the $NO_x$ storage reduction catalyst. It is therefore possible to maintain a high $NO_x$ purification rate of the $NO_x$ storage reduction catalyst.

Further, there is no longer a need for sulfur poisoning recovery control for releasing the $SO_x$ which is stored in the $NO_x$ storage reduction catalyst. In sulfur poisoning recovery control, the temperature of the $NO_x$ storage reduction catalyst is, for example, raised to about 600° C., then the air-fuel ratio of the exhaust gas is made the stoichiometric air-fuel ratio or rich. By performing the sulfur poisoning recovery control, it is possible to make the $SO_x$ be released. In sulfur poisoning recovery control, the $NO_x$ storage reduction catalyst becomes a high temperature, so thermal degradation of the $NO_x$ storage reduction catalyst is liable to occur. Further, the temperature of the exhaust gas becomes a high temperature, so thermal degradation is liable to occur in the exhaust treatment device which is arranged in the engine exhaust passage. By not performing the sulfur poisoning recovery control, it is possible to suppress thermal degradation of the exhaust treatment device which is arranged in the engine exhaust passage.

The sulfur constituent which is contained in the fuel or lubrication oil is slight in amount, so the $SO_x$ which is contained in the exhaust gas is slight in amount. For this reason, the $SO_x$ trap catalyst can store $SO_x$ over a long period. When the $SO_x$ trap catalyst becomes saturated by $SO_x$, the $SO_x$ trap catalyst is replaced. Alternatively, it is also possible to perform control similar to sulfur poisoning recovery control so as to make the $SO_x$ trap catalyst release the $SO_x$ only when the $SO_x$ stored amount of the $SO_x$ trap catalyst exceeds an allowable value.

Referring to FIG. 1, the opening and closing device in the present embodiment, constituted as the switching valve 73, is controlled to run all of the fuel to the main flow path 74 at the time of normal operation. At the time of normal operation, the secondary flow path 75 is closed and fuel is run only to the main flow path 74.

Figure 4:
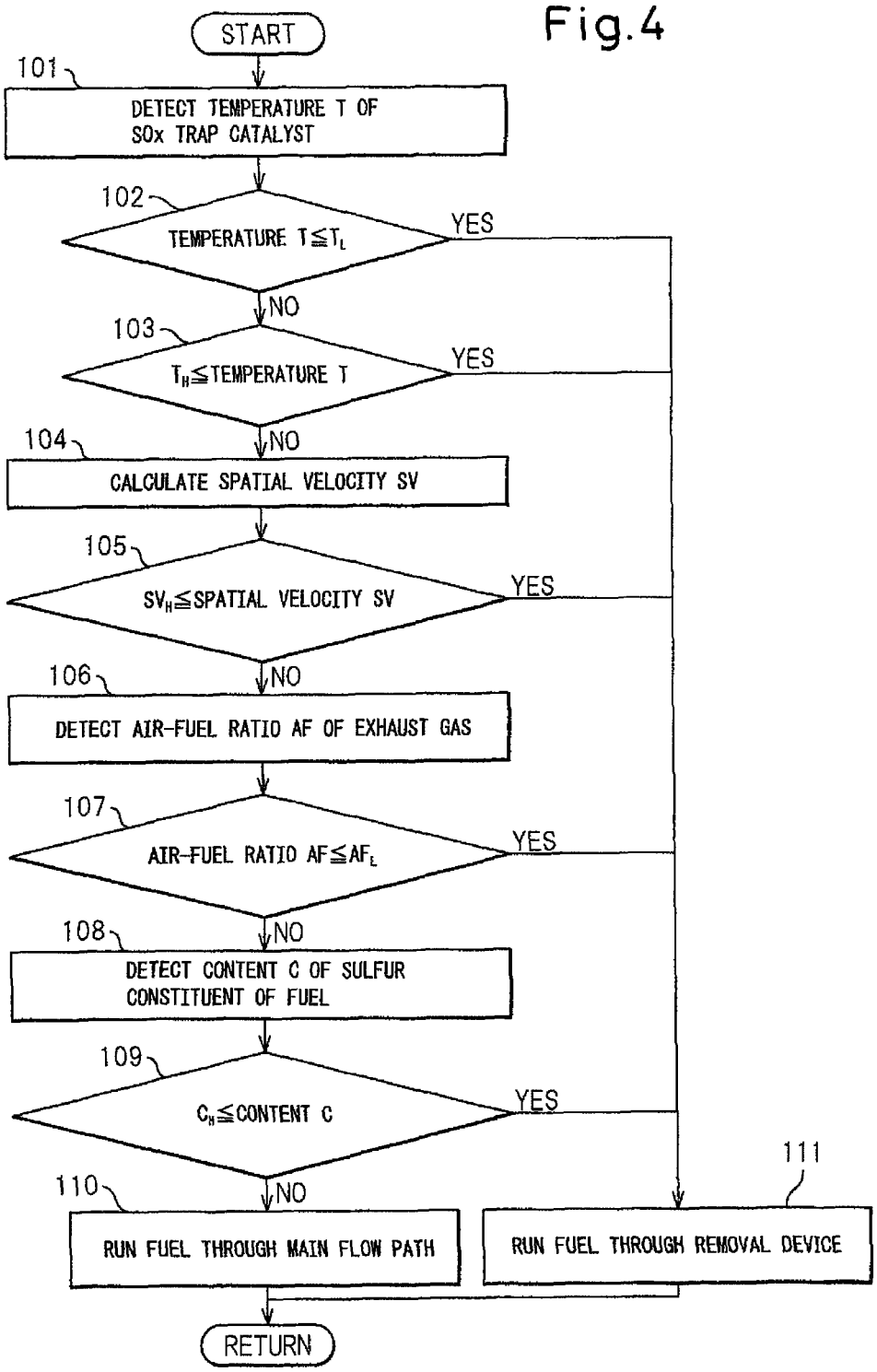
FIG. 4 is a flow chart of operational control of an exhaust purification system in a first embodiment.

FIG. 4 shows a flow chart of operational control in the present embodiment. This operational control of the present embodiment can be performed repeated every predetermined time period. The exhaust purification system of an internal combustion engine in the present embodiment uses the switching valve 73 to switch the flow path and make the fuel run through the removal device 70 when the $SO_x$ removal rate of the $SO_x$ trap catalyst 16 becomes a predetermined removal rate judgment value or less. Alternatively, it uses the switching valve 73 to switch the flow path and make the fuel run through the removal device 70 when the concentration of $SO_x$ which flows into the $SO_x$ trap catalyst 16 becomes a predetermined concentration judgment value or more.

First, it is judged if the $SO_x$ removal rate of the $SO_x$ trap catalyst is a predetermined removal rate judgment value or less. Here, the $SO_x$ removal rate is the ratio of the amount of $SO_x$ which is stored in the $SO_x$ trap catalyst with respect to the amount of $SO_x$ which flows into the $SO_x$ trap catalyst per predetermined time. The higher the $SO_x$ removal rate, the higher the ratio by which $SO_x$ is removed from the exhaust gas. In the present embodiment, the temperature of the $SO_x$ trap catalyst, the spatial velocity in the $SO_x$ trap catalyst, the air-fuel ratio of the exhaust gas flowing to the $SO_x$ trap catalyst, and the $SO_x$ stored amount are judged.

At step 101, the temperature of the $SO_x$ trap catalyst 16 is detected. Referring to FIG. 1, the temperature T of the $SO_x$ trap catalyst 16, for example, can be detected by the temperature sensor 26. At step 102, the temperature T of the $SO_x$ trap catalyst 16 and the low temperature judgment value $T_L$ are compared.

Figure 5:
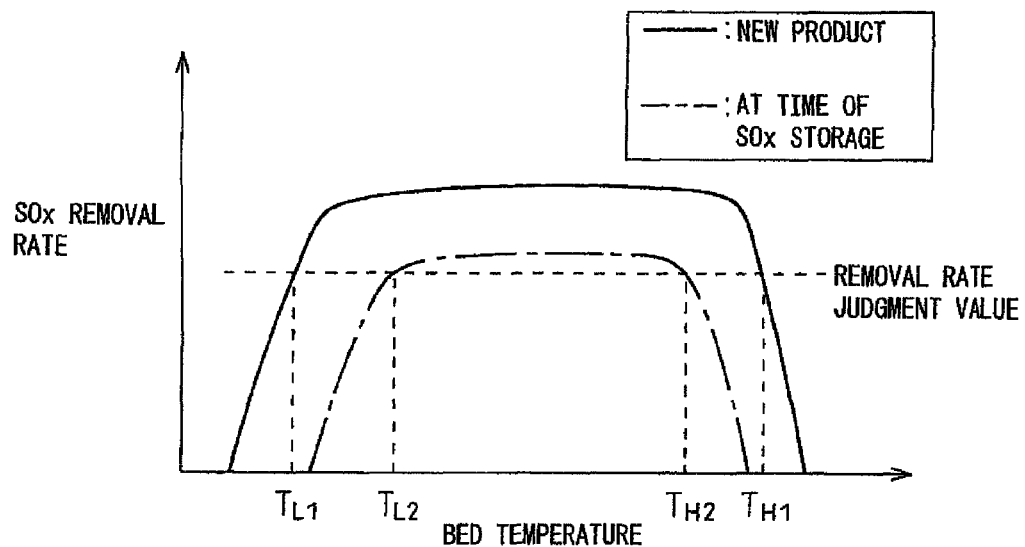
FIG. 5 is a graph showing a relationship between a bed temperature and $SO_x$ removal rate in an $SO_x$ trap catalyst.

FIG. 5 is a graph showing the relationship between the temperature of the $SO_x$ trap catalyst and the $SO_x$ removal rate of the $SO_x$ trap catalyst. FIG. 5 describes a graph at the time of the new product when use has just started and a graph at the time after continuous use where a predetermined amount of $SO_x$ is stored.

Referring to the graph at the time of the new product of the solid line, in the region where the temperature of the $SO_x$ trap catalyst, that is, the bed temperature T, is low, the $SO_x$ trap catalyst is not activated, so the $SO_x$ removal rate is small. Along with the rise of the bed temperature, the $SO_x$ removal rate rises, then a substantially constant removal rate is reached. Furthermore, if the bed temperature becomes higher, the $SO_x$ removal rate gradually decreases. The temperature $T_{L1}$ is a low temperature judgment value, while the temperature $T_{H1}$ is a high temperature judgment value. In the present embodiment, in the range where the bed temperature of the $SO_x$ trap catalyst is larger than the low temperature judgment value $T_{L1}$ and less than the high temperature judgment value $T_{H1}$, it is possible to secure a larger $SO_x$ removal rate than the predetermined removal rate judgment value.

Referring to FIG. 4, at step 102, it is judged if the temperature T of the $SO_x$ trap catalyst is the low temperature judgment value $T_{L1}$ or less. At step 103, it is judged if the temperature T of the $SO_x$ trap catalyst is the high temperature judgment value $T_{H1}$ or more. When, at step 102, the temperature T of the $SO_x$ trap catalyst is the low temperature judgment value $T_{L1}$ or less, the routine proceeds to step 111. When the temperature T of the $SO_x$ trap catalyst is larger than the low temperature judgment value $T_{L1}$, the routine proceeds to step 103. At step 103, it is judged if the temperature T of the $SO_x$ trap catalyst is the high temperature judgment value $T_{H1}$ or more. When the temperature T of the $SO_x$ trap catalyst is the high temperature judgment value $T_{H1}$ or more, the routine proceeds to step 111.

In this case, when the temperature T of the $SO_x$ trap catalyst is the predetermined low temperature side judgment value or less or the predetermined high temperature side judgment value or more, the $SO_x$ removal rate becomes the predetermined removal rate judgment value or less, then the routine proceeds to step 111.

When the temperature of the $SO_x$ trap catalyst is larger than the low temperature judgment value $T_{L1}$ and less than the high temperature judgment value $T_{H1}$, the $SO_x$ removal rate becomes larger than the predetermined removal rate judgment value. In this temperature range, the routine proceeds to step 104.

Next, at step 104, the spatial velocity SV at the $SO_x$ trap catalyst is calculated. The spatial velocity SV at the $SO_x$ trap catalyst corresponds to the flow rate of the exhaust gas flowing into the $SO_x$ trap catalyst. In the present embodiment, it is possible to use the speed of the engine body 1 to calculate the spatial velocity SV. Referring to FIG. 1, the speed of the engine body 1 can be calculated based on the output signal of the crank angle sensor 42.

Next, at step 105, it is judged if the calculated spatial velocity SV is the predetermined velocity judgment value $SV_{H1}$ or more.

Figure 6:
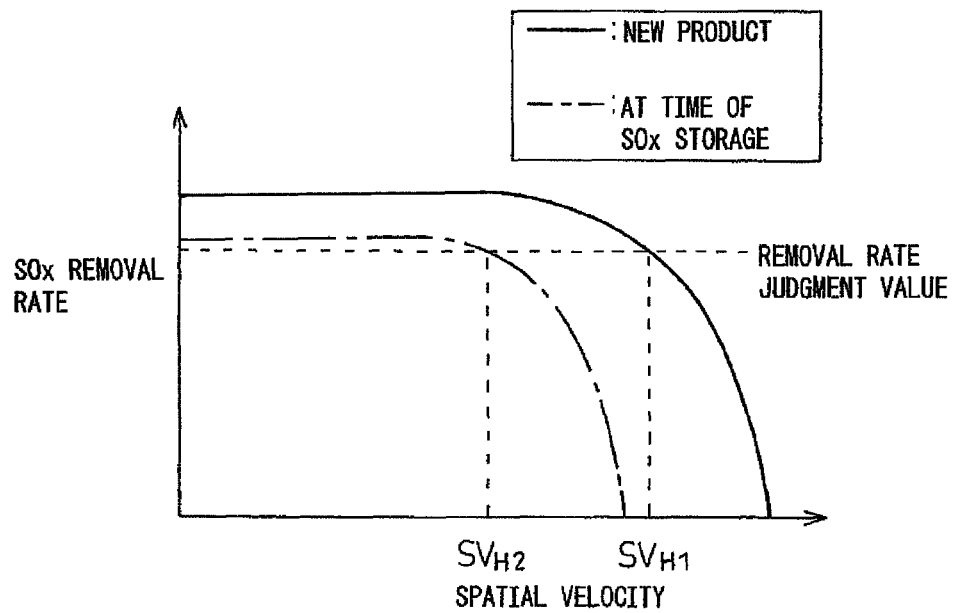
FIG. 6 is a graph showing a relationship between a spatial velocity and an $SO_x$ removal rate in an $SO_x$ trap catalyst.

FIG. 6 is a graph showing the relationship between the spatial velocity at the $SO_x$ trap catalyst and the $SO_x$ removal rate. In the region where the spatial velocity SV is small, the reaction between the $SO_x$ which is contained in the exhaust gas and the $SO_x$ trap catalyst becomes long and the $SO_x$ removal rate becomes high. In the region where the spatial velocity SV is small, the $SO_x$ purification rate becomes an approximately constant purification rate. In this regard, if the spatial velocity SV becomes large, the reaction time between the $SO_x$ which is contained in the exhaust gas and the $SO_x$ trap catalyst becomes short and the $SO_x$ removal rate gradually decreases. In the present embodiment, in the region of less than the spatial velocity $SV_{H1}$, it is possible to secure an $SO_x$ removal rate larger than the predetermined removal rate judgment value.

Referring to FIG. 4, at step 105, it is judged if the calculated spatial velocity SV is the predetermined velocity judgment value $SV_{H1}$ or more. If the spatial velocity SV is the velocity judgment value $SV_{H1}$ or more, the $SO_x$ removal rate becomes the predetermined removal rate judgment value or less, then the routine proceeds to step 111. If the spatial velocity SV is smaller than the velocity judgment value $SV_{H1}$, the predetermined $SO_x$ removal rate can be secured. In this case, the routine proceeds to step 106.

Next, at step 106, the air-fuel ratio of the exhaust gas flowing into the $SO_x$ trap catalyst is detected. Referring to FIG. 1, in the present embodiment, the air-fuel ratio AF of the exhaust gas flowing into the $SO_x$ trap catalyst 16 is detected by the air-fuel ratio sensor 28.

Next, at step 107, it is judged if the air-fuel ratio AF of the exhaust gas flowing into the $SO_x$ trap catalyst is the predetermined the air-fuel ratio judgment value $AF_{L1}$ or less.

Figure 7:
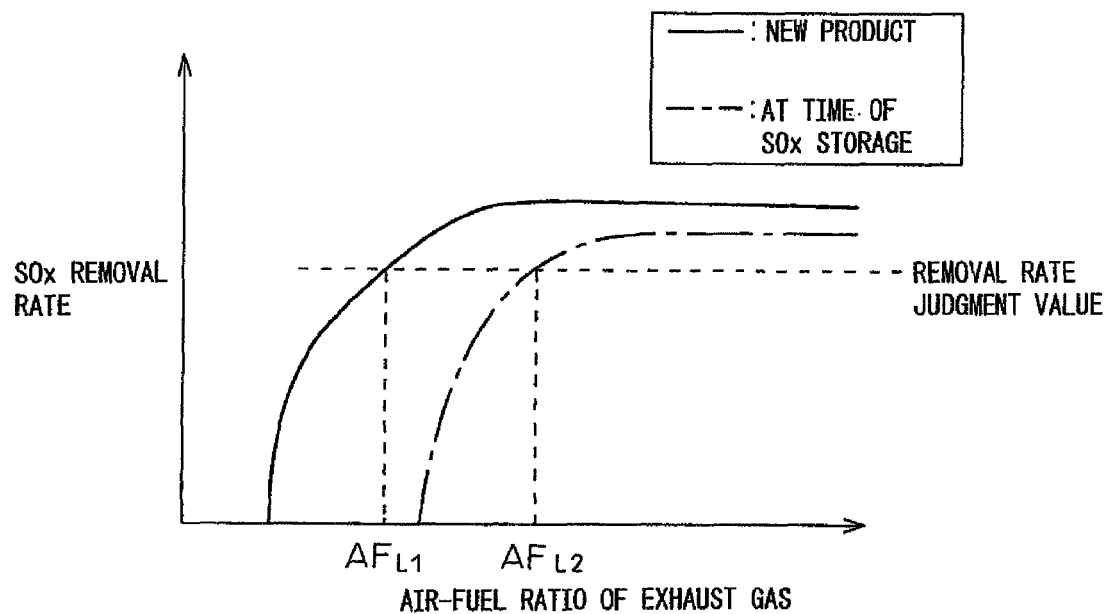
FIG. 7 is a graph showing a relationship between an air-fuel ratio of the exhaust gas and an $SO_x$ removal rate in an $SO_x$ trap catalyst.

FIG. 7 is a graph showing the relationship between the air-fuel ratio of the exhaust gas flowing into the $SO_x$ trap catalyst and the $SO_x$ removal rate. When the air-fuel ratio AF of the exhaust gas is lean, that is, when the air-fuel ratio of the exhaust gas is large, the exhaust gas contains a large amount of oxygen, so at the $SO_x$ trap catalyst, an $SO_x$ oxidation reaction is promoted. For this reason, a high $SO_x$ removal rate can be secured. In this regard, if the air-fuel ratio AF of the exhaust gas which flows into the $SO_x$ trap catalyst becomes small, that is, if shifting to the rich side, the oxygen which is contained in the exhaust gas becomes smaller, so the $SO_x$ removal rate falls. For example, when the accelerator pedal 40 is depressed and the demanded torque becomes larger, sometimes the air-fuel ratio at the time of combustion in the combustion chambers 2 becomes smaller. In such a case, the air-fuel ratio of the exhaust gas shifts to the rich side. In the present embodiment, in the region where the air-fuel ratio of the exhaust gas is larger than $AF_{L1}$, it is possible to secure an $SO_x$ removal rate larger than the predetermined removal rate judgment value.

Referring to FIG. 4, when, at step 107, the air-fuel ratio AF of the exhaust gas flowing into the $SO_x$ trap catalyst is the air-fuel ratio judgment value $AF_{L1}$ or less, the routine proceeds to step 111. When the air-fuel ratio of the exhaust gas flowing into the $SO_x$ trap catalyst is larger than $AF_{L1}$, the routine proceeds to step 108.

Next, it is, judged if the concentration of the $SO_x$ flowing into the $SO_x$ trap catalyst is a predetermined concentration judgment value or more. In the present embodiment, it is judged if the content of the sulfur constituent which is contained in the fuel fed into the combustion chambers is a predetermined content judgment value or more.

At step 108, the content of the sulfur constituent which is contained in the fuel is detected. In the present embodiment, a sulfur detector 29 which is arranged in the fuel tank 24 is used to detect the content of the sulfur constituent in the fuel. If the sulfur constituent which is contained in the fuel is large in amount, the concentration of the sulfur constituent which is contained in the exhaust gas also will become higher. If the concentration of the sulfur constituent which is contained in the exhaust gas becomes higher, the $SO_x$ removal rate falls.

Next, at step 109, it is judged if the content of the sulfur constituent which is contained in the fuel is a content judgment value or more. If the content C of the sulfur constituent which is contained in the fuel is the predetermined content judgment value $C_{H1}$ or more, the routine proceeds to step 111. If the content C of the sulfur constituent which is contained in the fuel is less than the content judgment value $C_{H1}$, the routine proceeds to step 110.

The case when the routine proceeds to step 110 corresponds to the case when the $SO_x$ removal rate at the $SO_x$ trap catalyst is larger than a predetermined removal rate judgment value and the case when the concentration of $SO_x$ flowing into the $SO_x$ trap catalyst is less than a predetermined concentration judgment value. At step 110, fuel is run to the main flow path. Referring to FIG. 1, if the secondary flow path 75 is open, the secondary flow path 75 is then closed. If the secondary flow path 75 is already closed, this state is maintained. By controlling the switching valve 73, the fuel is kept from flowing to the secondary flow path 75. Control is performed so that the fuel does not run through the sulfur constituent removal device 70.

On the other hand, when the $SO_x$ removal rate of the $SO_x$ trap catalyst is the removal rate judgment value or less or when the concentration of the $SO_x$ flowing into the $SO_x$ trap catalyst is the predetermined concentration judgment value or more, the routine proceeds to step 111. At step 111, the secondary flow path is opened. Referring to FIG. 1, the switching valve 73 is switched to the secondary flow path 75 side to make the fuel flow to the secondary flow path 75. If fuel is already running through the secondary flow path 75, this state is maintained. The fuel is made to run through the sulfur constituent removal device 70.

By making fuel run through the removal device 70, at least part of the sulfur constituent can be removed from the fuel and the amount of $SO_x$ which is exhausted from the combustion chambers 2 can be decreased. It is possible to decrease the amount of $SO_x$ which flows into the $SO_x$ trap catalyst 16. As a result, it is possible to keep $SO_x$ from flowing out from the $SO_x$ trap catalyst 16. In the present embodiment, it is possible to keep $SO_x$ from building up at the $NO_x$ storage reduction catalyst which is arranged downstream of the $SO_x$ trap catalyst 16.

In the present embodiment, when the $SO_x$ removal rate becomes small and the concentration of $SO_x$ flowing into the $SO_x$ trap catalyst becomes high, fuel is made to run through the removal device 70. As opposed to this, it is also possible to make fuel constantly flow to the removal device during operation of the internal combustion engine so as to remove the sulfur constituent. However, a removal device has a maximum capacity by which it can store $SO_x$. To make the removal device continuously remove the sulfur constituent, the removal device would become large in size. For this reason, it is preferable to remove the sulfur constituent by the removal device only as necessary.

In this regard, as explained above, the $SO_x$ trap catalyst gradually stores the $SO_x$. The amount of $SO_x$ which can be stored, that is, the storable amount, decreases along with storage of $SO_x$. The storable amount of $SO_x$ is the storable amount of $SO_x$ at the time of the new product minus the $SO_x$ stored amount. If the storable amount of $SO_x$ decreases, that is, if the $SO_x$ stored amount increases, the $SO_x$ removal rate becomes smaller. For this reason, the operating range where a predetermined removal rate judgment value can be achieved becomes narrower.

The exhaust purification system in the present embodiment changes the judgment value for judging whether to run fuel through the removal device in accordance with the $SO_x$ stored amount of the $SO_x$ trap catalyst. The exhaust purification system in the present embodiment is provided with a detection device which can detect the $SO_x$ stored amount of the $SO_x$ trap catalyst at any time. In the present embodiment, the $SO_x$ stored amount is calculated continuously during operation of the internal combustion engine.

Figure 8:
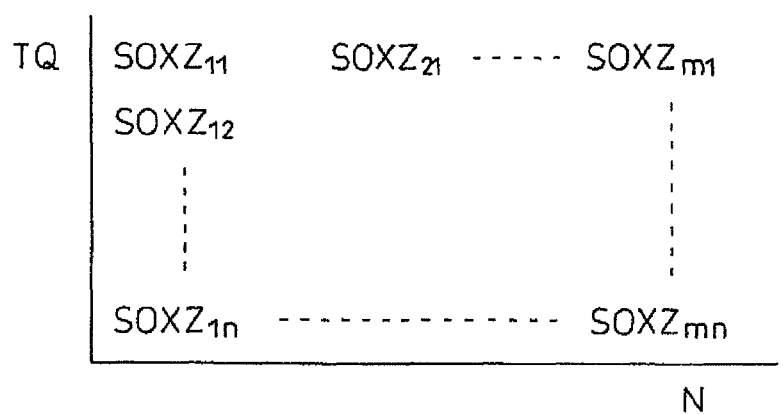
FIG. 8 is a map for calculation of the amount of $SO_x$ exhausted from an engine body per unit time.

FIG. 8 shows a map of the $SO_x$ amount which is stored per unit time in an $SO_x$ trap catalyst as a function of the engine speed and the demanded torque. By detecting the engine speed N and the demanded torque TQ, it is possible to find the $SO_x$ amount SOXZ which is stored in the $SO_x$ trap catalyst per unit time. This map is, for example, stored in the ROM 32 of the electronic control unit 30. Along with continued operation, the amount of $SO_x$ which is stored per unit time is found from this map every predetermined time period. By multiplying the amount of $SO_x$ which is stored per unit time with a predetermined time, it is possible to calculate the $SO_x$ stored amount. By cumulatively adding the calculated $SO_x$ stored amount, it is possible to detect the $SO_x$ stored amount at any instant. The $SO_x$ stored amount is, for example, stored in the RAM 33.

The detection device of the $SO_x$ amount which is stored in the $SO_x$ trap catalyst is not limited to this. It is possible to employ any device which can detect the $SO_x$ stored amount. For example, an $SO_x$ sensor is arranged in the engine exhaust passage at the downstream side from the $SO_x$ trap catalyst. If the $SO_x$ stored amount of the $SO_x$ trap catalyst increases, the amount of outflowing $SO_x$ increases. It is also possible to detect the slight amount of $SO_x$ flowing out from the $SO_x$ trap catalyst and thereby estimate the $SO_x$ stored amount of the $SO_x$ trap catalyst.

Referring to FIG. 5, the graph of the time when a predetermined amount of $SO_x$ is stored at the $SO_x$ trap catalyst is shown by the one-dot chain line. In the state where $SO_x$ is stored, the temperature range where the predetermined removal rate judgment value can be achieved becomes narrow. In the example shown in FIG. 5, for the low temperature judgment value of the bed temperature of the $SO_x$ trap catalyst when $SO_x$ is stored, the temperature $T_{L2}$ is employed. Further, as the high temperature judgment value, the temperature $T_{H2}$ is employed. The temperature range where an $SO_x$ removal rate larger than a predetermined removal rate judgment value can be achieved is larger than the low temperature judgment value $T_{L2}$ and less than the high temperature judgment value $T_{H2}$. Referring to FIG. 4, at step 102 or step 103, when the bed temperature of the $SO_x$ trap catalyst is the low temperature judgment value $T_{L2}$ or less or when the bed temperature of the $SO_x$ trap catalyst is the high temperature judgment value $T_{H2}$ or more, the routine proceeds to step 111 where the fuel is made to run through the removal device.

Referring to FIG. 6, the graph of the time when a predetermined amount of $SO_x$ is stored in the $SO_x$ trap catalyst is shown by the one-dot chain line. In the example shown in FIG. 6, the judgment value of the spatial velocity when a predetermined amount of $SO_x$ is stored in the $SO_x$ trap catalyst becomes the velocity $SV_{H2}$. The velocity judgment value $SV_{H2}$ becomes smaller than the velocity judgment value $SV_{H1}$ at the time of a new product. Referring to FIG. 4, at step 105, when the spatial velocity SV is the velocity judgment value $SV_{H2}$ or more, the routine proceeds to step 111 where fuel is made to run through the removal device.

Referring to FIG. 7, the graph of the time when a predetermined amount of $SO_x$ is stored in the $SO_x$ trap catalyst is shown by the one-dot chain line. The air-fuel ratio judgment value of the exhaust gas flowing into the $SO_x$ trap catalyst when a predetermined amount of $SO_x$ is stored in the $SO_x$ trap catalyst becomes the air-fuel ratio $AF_{L2}$. The air-fuel ratio judgment value $AF_{L2}$ becomes larger than the air-fuel ratio judgment value $AF_{L1}$ at the time of a new product. Referring to FIG. 4, at the step 107, when the air-fuel ratio AF of the exhaust gas is the air-fuel ratio judgment value $AF_{L2}$ or less, the routine proceeds to step 111 where fuel is made to run through the removal device.

Furthermore, when a predetermined amount of $SO_x$ is stored at the $SO_x$ trap catalyst, it is possible to change the content judgment value of the sulfur constituent which is contained in the fuel. The content judgment value $C_{H2}$ of the sulfur constituent which is contained in the fuel when a predetermined amount of $SO_x$ is stored in the $SO_x$ trap catalyst becomes smaller than the content judgment value $C_{H1}$ of the sulfur constituent at the time of a new product. Referring to FIG. 4, at step 109, when the content C of the sulfur constituent of the fuel is the content judgment value $C_{H2}$ or more, the routine proceeds to step 111 where it is possible to make the fuel run through the removal device.

In this case, it is possible to employ a judgment value in accordance with the $SO_x$ stored amount of the $SO_x$ trap catalyst. Due to this configuration, it is possible to determine the operating range by which the removal rate judgment value can be achieved in accordance with the $SO_x$ stored amount of the $SO_x$ trap catalyst and suppress outflow of $SO_x$ from the $SO_x$ trap catalyst more reliably. Alternatively, it is possible to avoid fuel being excessively run through the sulfur constituent removal device. The judgment values corresponding to the respective $SO_x$ stored amounts are, for example, stored in the ROM 32 of the electronic control unit 30.

In this regard, in the $SO_x$ trap catalyst, when the $SO_x$ stored amount reaches the saturation level, it is no longer possible to store the $SO_x$. Further, if the $SO_x$ stored amount approaches the saturation level, the amount of $SO_x$ which flows out from the $SO_x$ trap catalyst increases. If the $SO_x$ stored amount increases and the $SO_x$ removal rate becomes a predetermined removal rate judgment value or less, it is possible to make the fuel run through the removal device and to remove the sulfur constituent from the fuel. For example, control may be performed to make the fuel run through the removal device when the $SO_x$ stored amount of the $SO_x$ trap catalyst becomes a predetermined stored amount judgment value or more.

The exhaust purification system of an internal combustion engine in the present embodiment was explained taking the example of using, as the judgment value for judgment of the $SO_x$ removal rate of the $SO_x$ trap catalyst, the temperature of the $SO_x$ trap catalyst, the air-fuel ratio of the exhaust gas flowing into the $SO_x$ trap catalyst, the spatial velocity, and the $SO_x$ stored amount, but the invention is not limited to this embodiment. It is possible to make the fuel run through the removal device when the $SO_x$ removal rate becomes the predetermined removal rate judgment value or less due to the change of any variable.

Further, in the present embodiment, as the judgment value for judging the concentration of the $SO_x$ flowing into the $SO_x$ trap catalyst, the content of the sulfur constituent which is contained in the fuel was used as an example for the explanation, but the invention is not limited to this embodiment. It is possible to make the fuel run through the removal device when the concentration of $SO_x$ flowing into the $SO_x$ trap catalyst becomes a predetermined concentration judgment value or more due to the change of any variable. For example, an $SO_x$ sensor is arranged in the engine exhaust passage at the upstream side of the $SO_x$ trap catalyst to detect the concentration of $SO_x$ flowing into the $SO_x$ trap catalyst. It is also possible to make the fuel run through the removal device when the $SO_x$ concentration becomes a predetermined concentration judgment value or more.

Further, in the present embodiment, a sulfur concentration sensor 29 is arranged in the fuel tank 24 and the output of the sulfur concentration sensor 29 is used to detect the concentration of the sulfur constituent which is contained in the fuel, but the invention is not limited to this embodiment. Any method may be used to detect the concentration of the sulfur constituent which is contained in the fuel. For example, when the vehicle is provided with a GPS (Global Positioning System) as a positioning measuring system and the position of the vehicle is identified, it is possible to identify a store selling fuel so as to detect the content of the sulfur constituent which is contained in the fuel. Alternatively, a passenger or worker can enter the concentration of the sulfur constituent by manual input.

In the present embodiment, all of the temperature of the $SO_x$ trap catalyst, the spatial velocity, the air-fuel ratio of the exhaust gas, the content of the sulfur constituent contained in the fuel, and the $SO_x$ stored amount are judged, but the invention is not limited to this embodiment. It is also possible to detect just one or more of these to judge if fuel should be made to run through the sulfur constituent removal device.

The switching valve used as the opening and closing device in the present embodiment is formed so that all of the fuel is made to run through either the main flow path or the secondary flow path, but the invention is not limited to this embodiment. The opening and closing device may also be formed so as to enable the flow rate of the fuel flowing into the removal device to be adjusted. For example, the opening and closing device may also include a flow rate regulator. The opening and closing device may also be formed so that part of the fuel is run through the secondary flow path and the other fuel is run through the main flow path. The opening and closing device may make at least part of the fuel flowing through the main flow path flow through the secondary flow path to run it through the removal device.

Further, the opening and closing device may also be formed so that the flow rate of the fuel flowing into the removal device can be adjusted in accordance with the $SO_x$ removal rate of the $SO_x$ trap catalyst or the concentration of the $SO_x$ which flows into the $SO_x$ trap material. It is also possible to estimate the $SO_x$ removal rate and to use the estimated $SO_x$ removal rate and a predetermined removal rate judgment value as the basis to determine the flow rate of fuel to run through the removal device. Alternatively, it is also possible to estimate the concentration of the $SO_x$ flowing to the $SO_x$ trap catalyst and use the estimated concentration of the $SO_x$ and a predetermined concentration judgment value as the basis to determine the flow rate of fuel to run through the removal device. For example, it is possible to perform control to run a small amount of fuel through the removal device when the $SO_x$ removal rate becomes slightly smaller than the judgment value.

Further, in the present embodiment, fuel was continuously run through the removal device when judging that fuel should be run through the removal device for removing the sulfur constituent, but the invention is not limited to this embodiment. It is also possible to intermittently make the fuel run through the removal device.

Further, in the present embodiment, regardless of the $SO_x$ stored amount of the $SO_x$ trap catalyst, a constant removal rate judgment value or a constant concentration judgment value is used, but the invention is not limited to this embodiment. It is also possible to change the removal rate judgment value or concentration judgment value in accordance with the $SO_x$ stored amount which is stored in the $SO_x$ trap catalyst.

The exhaust purification system of an internal combustion engine in the present embodiment is arranged in a vehicle, but the invention is not limited to this embodiment. The present invention can be applied to an exhaust purification system of any internal combustion engine.

Second Embodiment

Figure 9:
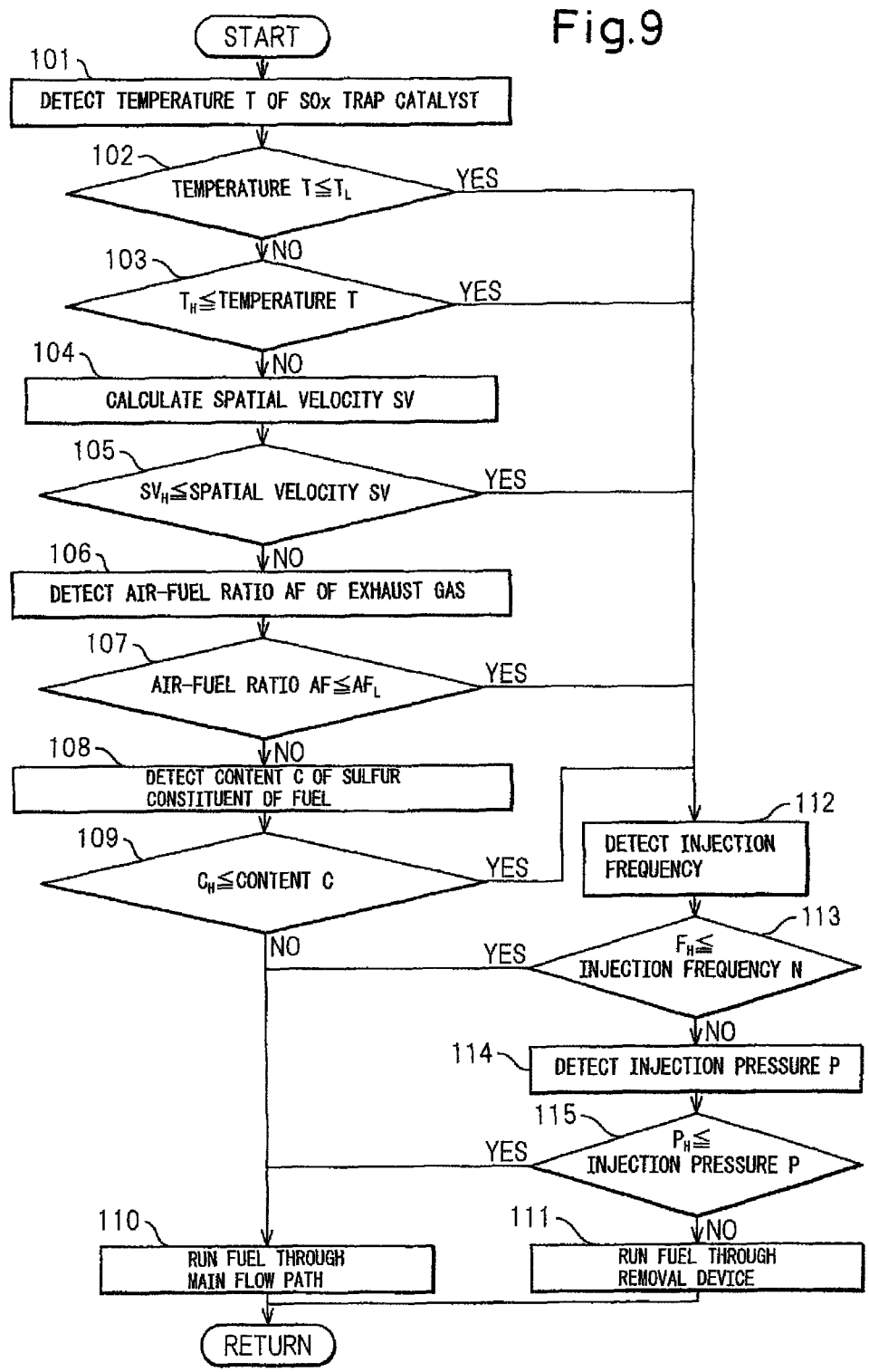
FIG. 9 is a flow chart of operational control of an exhaust purification system in a second embodiment.
Figure 10:
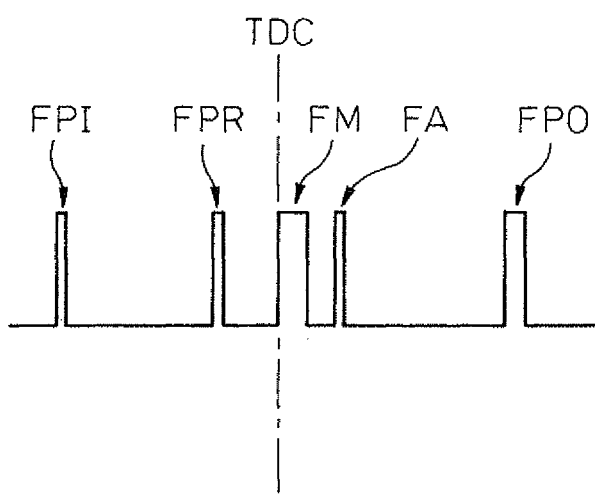
FIG. 10 is a schematic view for explaining fuel injection in a combustion chamber.

Referring to FIG. 9 and FIG. 10, an exhaust purification system of an internal combustion engine in a second embodiment will be explained. The configuration of the internal combustion engine in the present embodiment is similar to that in the first embodiment (see FIG. 1).

FIG. 9 shows a flow chart of operational control of the exhaust purification system in the present embodiment. The operational control in the present embodiment can be performed repeated every predetermined time period. Step 101 to step 109 are similar to the first embodiment. In the present embodiment, when it is judged that the $SO_x$ removal rate of the $SO_x$ trap catalyst is a predetermined removal rate judgment value or less or when it is judged that the concentration of the $SO_x$ which flows into the $SO_x$ trap catalyst is a predetermined concentration judgment value or more, the routine proceeds to step 112.

The sulfur constituent which is contained in fuel has the function of lubricating moving parts of the fuel injectors 3 which inject fuel to the combustion chambers 2. In the present embodiment, when the lubrication performance demanded in the fuel injectors 3 becomes high, control is performed to close the secondary flow path 75 and to prevent fuel from being run through the removal device 70.

At step 112, the injection frequency F of the fuel in one fuel cycle is detected. One fuel cycle of the internal combustion engine in the present embodiment includes an intake stroke, a compression stroke, an expansion stroke, and an exhaust stroke.

FIG. 10 shows a schematic view of an injection pattern of fuel in the present embodiment. The internal combustion engine in the present embodiment performs an auxiliary injection in addition to a main injection in one fuel cycle. In the example shown in FIG. 10, fuel is injected five times in one fuel cycle. To obtain engine output, the main injection FM is performed at about compression top dead center TDC.

Right before the main injection FM, sometimes pre-injection FPR is performed. By performing pre-injection FPR, it is possible to stabilize the combustion. Further, before the pre-injection FPR, a pilot injection FPI is sometimes performed. The pilot injection FPI is, for example, performed at a timing earlier than the main injection FM by a crank angle of 20° or more. The pilot injection FPI premixes the air and fuel before the fuel is burned and thereby enables stable combustion of the main injection.

The pre-injection FPR and the pilot injection FPI which are performed before the main injection FM enable stabilization of combustion, so for example are effective if performed right after startup of the internal combustion engine or otherwise when the temperature of the engine body is low. Further, by performing the pilot injection FPI or the pre-injection FPR, it is possible to suppress noise of the engine body or the production of $NO_x$.

After the main injection FM, sometimes after-injection FA is performed. After-injection FA is performed at a timing when combustion is possible after the main injection. After-injection FA is, for example, performed in the range of a crank angle after compression top dead center up to about 40°. By performing the after-injection FA, the after-burning period becomes longer, so for example it is possible to burn off soot left over from burning fuel. It is therefore possible to suppress the exhaust of particulate matter.

Further, when it is necessary to raise the temperature of the exhaust treatment device which is arranged in the engine exhaust passage, after-injection FA may be performed to raise the temperature of the exhaust gas. The heat of the exhaust gas may be used to raise the temperature of the exhaust treatment device. For example, when a particulate filter is arranged in the engine exhaust passage, the particulate filter is raised in temperature when regenerating it. At the time of raising the temperature of the exhaust treatment device in this way, it is possible to perform after-injection FA to raise the temperature of the exhaust gas.

Further, after the main injection FM, sometimes post injection FPO is performed after auxiliary injection. Post injection FPO is injection where fuel is not burned in the combustion chamber. After-injection affects the engine output, while post injection has the feature of not contributing to engine output. Post injection FPO is, for example, performed in a range of a crank angle after compression top dead center of about 90° to about 120°. By performing the post injection FPO, when unburned fuel has to be fed to the exhaust treatment device arranged in the engine exhaust passage, it is possible to feed unburned fuel to the engine exhaust passage.

For example, when an $NO_x$ storage reduction catalyst is arranged in the engine exhaust passage, the stored $NO_x$ is released and reduced in $NO_x$ release control. In $NO_x$ release control, the air-fuel ratio of the exhaust gas is made the stoichiometric air-fuel ratio or rich. At the time of $NO_x$ release control, post injection FPO is performed to feed unburned fuel to the engine exhaust passage. As a result, the air-fuel ratio of the exhaust gas can be made the stoichiometric air-fuel ratio or rich.

In this case, sometimes fuel is injected a plurality of times in one fuel cycle. If the frequency of injection of fuel increases, a greater lubrication performance is demanded in the fuel injectors. Referring to FIG. 9, at step 113, it is judged if the injection frequency F of fuel in one fuel cycle is a predetermined injection frequency judgment value $F_H$ or more. The injection frequency judgment value $F_H$ is, for example, stored in the ROM 32 of the electronic control unit 30.

When, at step 113, the injection frequency F of fuel in one fuel cycle is the predetermined injection frequency judgment value $F_H$ or more, the routine proceeds to step 110 where the fuel is made to run through the main flow path. That is, the secondary flow path is closed to feed fuel without going through the sulfur constituent removal device. When, at step 113, the fuel injection frequency F is less than the injection frequency judgment value $F_H$, the routine proceeds to step 114.

At step 114, the fuel injection pressure P is detected. The injection pressure P can be detected by the pressure sensor 44 which is arranged at the common rail 22. If the injection pressure P becomes greater, the force which is applied to the moving parts of the fuel injectors 3 becomes larger. For this reason, a high lubrication performance is demanded at the fuel injectors.

At step 115, it is judged if the injection pressure P is the injection pressure judgment value $P_H$ or more. When the injection pressure P is the injection pressure judgment value $P_H$ or more, the routine proceeds to step 110 where the fuel is made to run through the main flow path. When the injection pressure P is less than the injection pressure judgment value $P_H$, the routine proceeds to step 111. At step 111, the fuel is made to run through the secondary flow path. That is, the fuel is made to run through the sulfur constituent removal device, then is fed to the combustion chambers.

In this case, in the present embodiment, if the lubrication performance which is demanded at the fuel injectors is high, the secondary flow path is closed and the fuel is prevented from running through the sulfur constituent removal device. In particular, it is preferable to close the secondary flow path when, in the fuel injectors, a higher lubrication performance is demanded than in the constant operating state of the engine body. This configuration enables a drop in the injection performance or damage of a fuel addition valve to be avoided. For example, it is possible to keep the amount of injection of fuel from the fuel injectors and the injection timing of fuel from becoming inaccurate.

In the present embodiment, as cases when the lubrication performance which is demanded in the fuel injectors is high, the case when the injection frequency of fuel is an injection frequency judgment value or more and the case when an injection pressure of fuel is an injection frequency judgment value or more were used as examples for the explanation, but the invention is not limited to this embodiment. It is possible to cut off the flow to the sulfur constituent removal device in any case where a high lubrication performance is demanded at the fuel injectors.

Further, in the present embodiment, when a high lubrication performance is demanded at the fuel injectors, circulation to the sulfur constituent removal device is cut, but the invention is not limited to this embodiment. Control may also be performed to reduce the flow rate of the fuel which runs through the removal device. For example, it is also possible to calculate the flow rate of the fuel which runs through the removal device in accordance with the detected injection frequency and injection pressure and use the calculated flow rate to run fuel through the removal device.

The rest of the configuration, the action, and the effects are similar to the first embodiment, so here the explanations will not be repeated.

Third Embodiment

Figure 11:
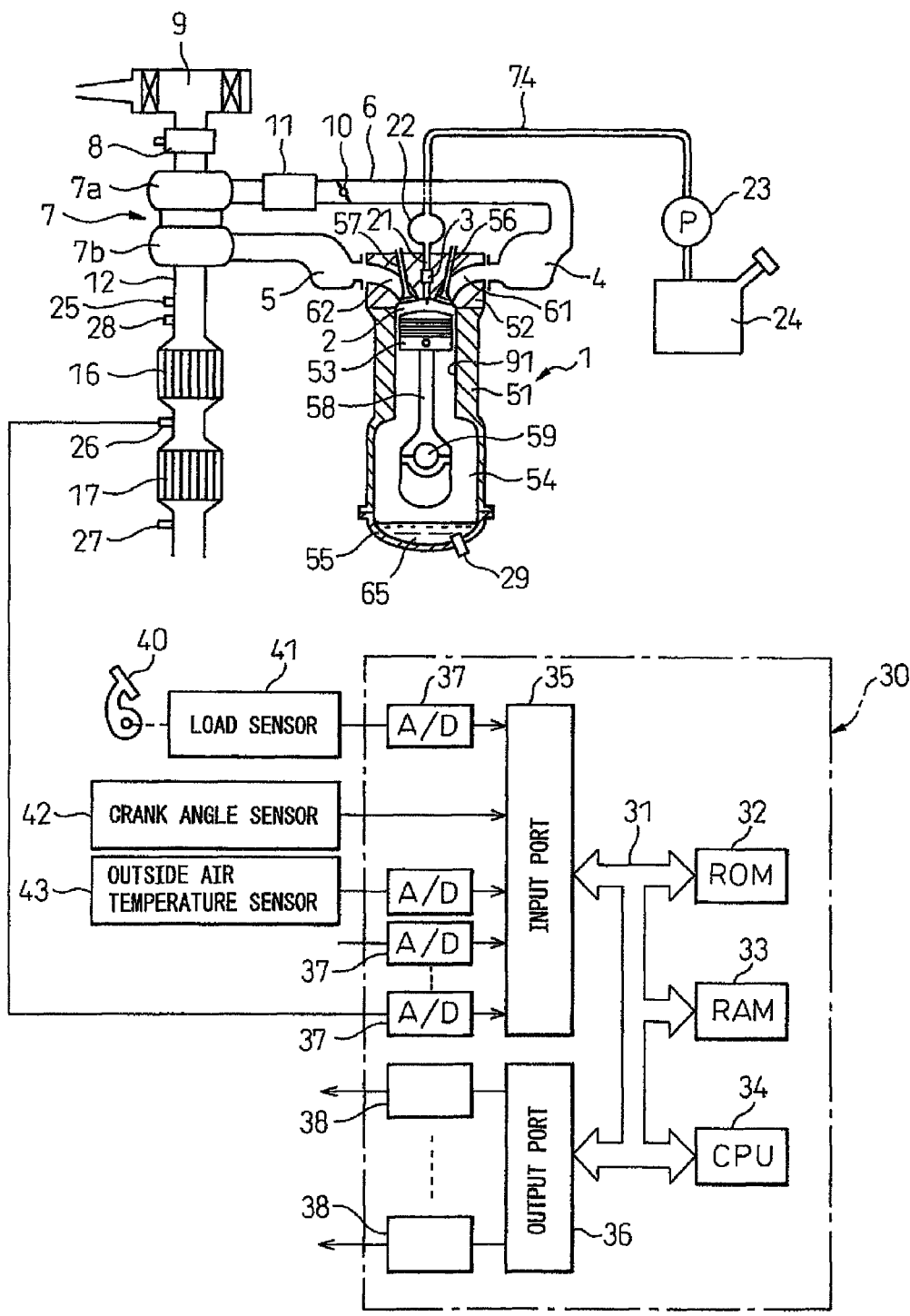
FIG. 11 is a schematic view of an internal combustion engine in a third, embodiment.
Figure 12:
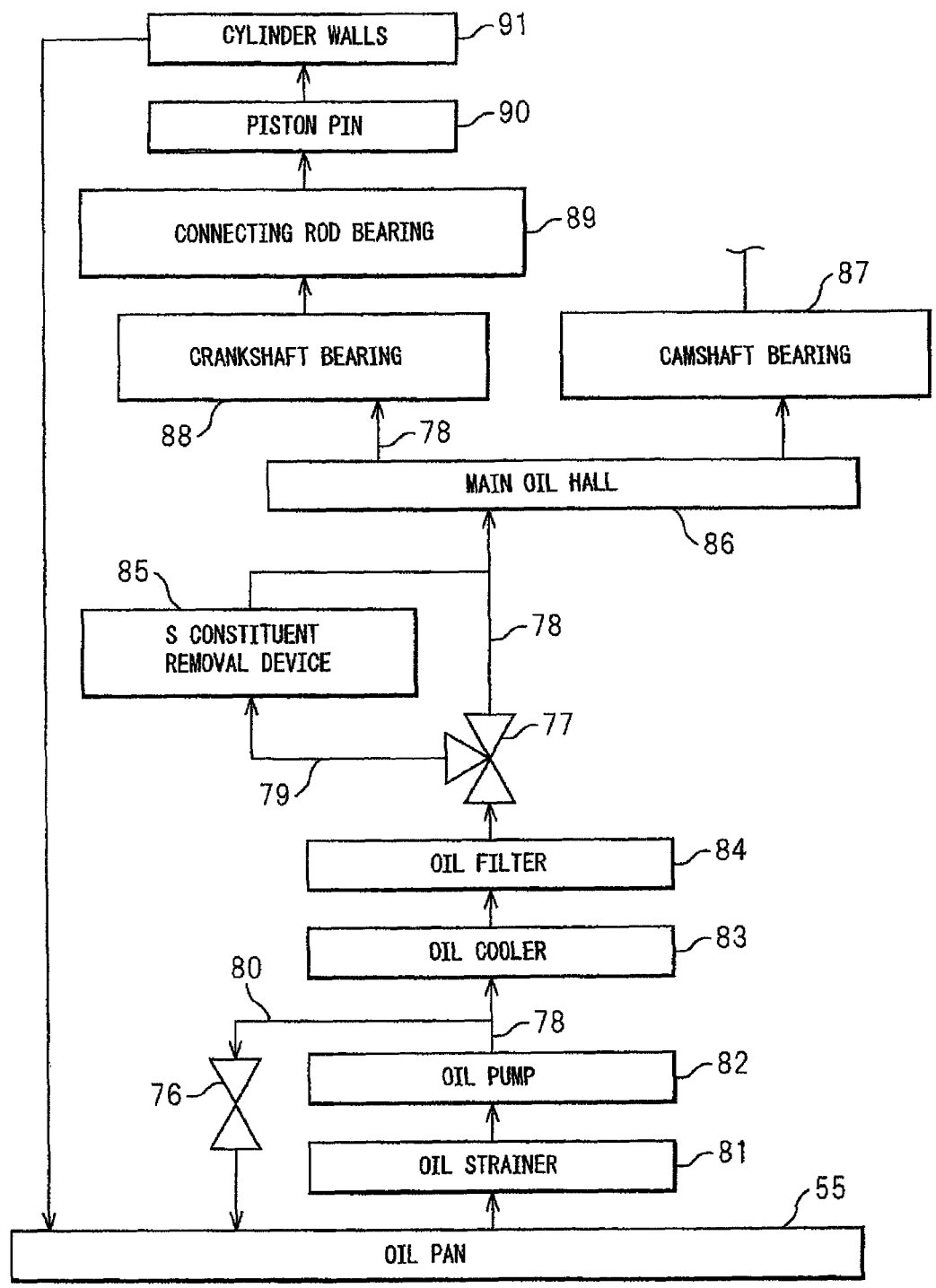
FIG. 12 is a schematic system diagram of a lubrication oil feed system in an internal combustion engine in a third embodiment.
Figure 13:
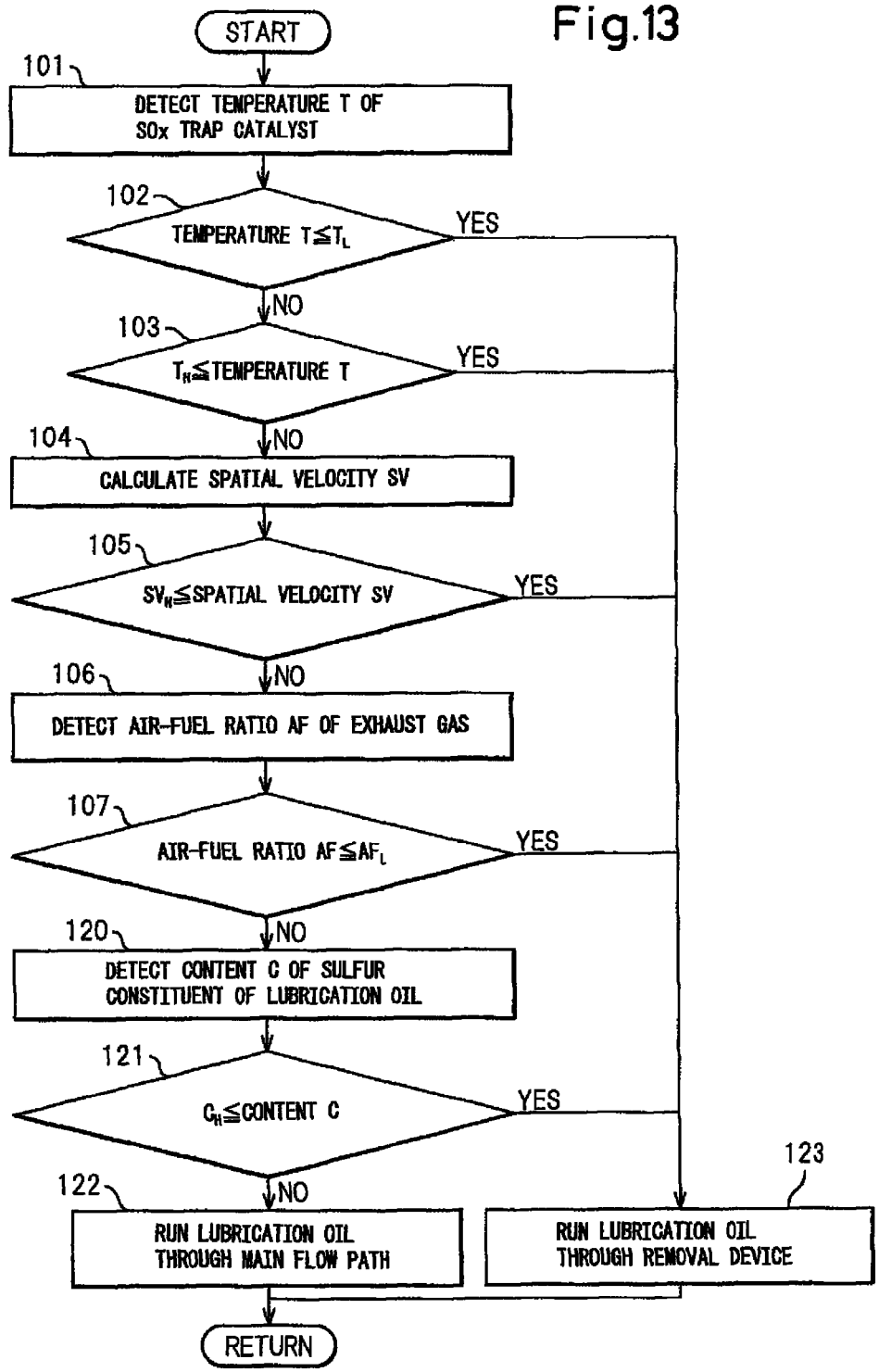
FIG. 13 is a flow chart of operational control of an exhaust purification system in a third embodiment.

Referring to FIG. 11 to FIG. 13, an exhaust purification system of an internal combustion engine in a third embodiment will be explained. In the exhaust purification system of an internal combustion engine in the present embodiment, the removal device for removing the sulfur constituent is arranged in the feed flow path of lubrication oil for lubricating the engine body. The exhaust purification system in the present embodiment removes the sulfur constituent which is contained in the lubrication oil instead of removing the sulfur constituent of the fuel as in the first embodiment and second embodiment.

FIG. 11 shows a schematic view of the internal combustion engine in the present embodiment. The lubrication oil 65 is stored at the bottom of the crank case 54 of the engine body 1. At the bottom of the oil pan 55, a sulfur concentration sensor 29 is arranged for detecting the concentration of the sulfur constituent which is contained in the lubrication oil 65. At the engine exhaust passage at the upstream side of the $SO_x$ trap catalyst 16, a temperature sensor 25 is arranged for detecting the temperature of the gas exhausted from the engine body 1. The output signals of these sulfur concentration sensor 29 and temperature sensor 25 are input through the corresponding AD converters 37 to the input port 35.

FIG. 12 shows a system diagram of an lubrication oil feed system in the present embodiment. The internal combustion engine in the present embodiment is provided with a lubrication oil feed system which feeds lubrication oil to the components arranged in the engine body 1. The lubrication oil feed system is provided with an oil pan 55 serving as a member for storing lubrication oil and with an oil pump 82. The lubrication oil is fed through the main flow path 78 to the components of the engine body 1. The lubrication oil which is stored in the oil pan 55 passes through an oil strainer 81 and is discharged from the oil pump 82 by the oil pump 82 being driven. At the oil strainer 81, large foreign matter is removed. At the outlet of the oil pump 82 of the main flow path 78, a return flow path 80 for returning lubrication oil to the oil pan 55 is connected. At the return flow path 80, a relief valve 76 is arranged. The relief valve 76 is controlled so as to return lubrication oil to the oil pan 55 when the outlet pressure of the oil pump 82 exceeds the allowable value.

The outlet of the oil pump 82 is connected through an oil cooler 83 and oil filter 84 to a main oil hall 86. The oil cooler 83 cools the lubrication oil. The oil filter 84 removes the foreign matter included in the lubrication oil. The main oil hall 86 is a space which temporarily stores the lubrication oil.

In the present embodiment, in the main flow path 78, an opening and closing device constituted by a switching valve 77 is arranged between the oil filter 84 and the main oil hall 86. The main flow path 78 has a secondary flow path 79 connected to it which bypasses the main flow path 78. The switching valve 77 is arranged at a branching point of the main flow path 78 and the secondary flow path 79. The switching valve 77 is formed so as to enable the flow of lubrication oil flowing into the secondary flow path 79 to be cut off or restarted. That is, the switching valve 77 is formed to open and close the secondary flow path 79. The switching valve 77 in the present embodiment is formed so as to switch the flow of lubrication oil between the main flow path 74 and the secondary flow path 75. The switching valve 77 is controlled by the electronic control unit 30.

In the secondary flow path 79, a sulfur constituent removal device 85 is arranged. The removal device 85, like the sulfur constituent removal device in the first embodiment, is formed to remove the sulfur constituent which is contained in the lubrication oil by adsorption. The sulfur constituent removal device is not limited to this embodiment. It is possible to employ any device which can remove the sulfur constituent which is contained in the lubrication oil.

The lubrication oil which is stored in the main oil hall 86 passes through the main flow path 78 and is fed toward the different components of the engine body. In the example shown in FIG. 12, the lubrication oil which flows out from the main oil hall 86 flows to a crankshaft bearing 88 which supports the crankshaft 59. The lubrication oil which flows out from the crankshaft bearing 88 is fed to the connecting rod bearing 89 which supports the connecting rod 58. In the present embodiment, the lubrication oil passes through the inside of the connecting rod 58 and is fed to the piston pins 90 supporting the pistons 53. The lubrication oil which flows out from the piston pins 90 passes through holes which are formed in the wall parts of the pistons 53 and is fed to the cylinder walls 91. The lubrication oil which is fed to the cylinder walls 91 drops down to the oil pan 55 due to the action of gravity. Further, the lubrication oil which leaks out from the clearances between the components drops down to the oil pan 55 due to the action of gravity.

The lubrication oil which flows out from the main oil hall 86 is also fed to the other components. For example, lubrication oil is fed to the camshaft bearing 87 which supports the camshaft. The lubrication oil feed system may further be formed so as to feed lubrication oil to the exhaust turbocharger 7. The lubrication oil which is fed to the components is again returned to the oil pan 55. The lubrication oil runs through the inside of the engine body 1. The lubrication oil feed system is not limited to this embodiment. It need only be formed so that lubrication oil is supplied to the cylinder walls 91.

The lubrication oil which is supplied to the cylinder walls 91 lowers the frictional resistance between the pistons 53 and the cylinder walls 91. In this regard, the lubrication oil contains a sulfur constituent for lubrication. The lubrication oil sticks to the cylinder walls 91 of the combustion chambers 2. When fuel is burned in the combustion chambers 2, $SO_x$ is produced from the sulfur constituent which is contained in the lubrication oil stuck to the cylinder walls 91. The produced $SO_x$ is exhausted into the engine exhaust passage.

The switching valve 77 of the lubrication oil feed system in the present embodiment is controlled so that at the time of normal operation, lubrication oil flows through the main flow path 78. At the time of normal operation, the secondary flow path 79 is closed and lubrication oil flows to only the main flow path 78.

In the present embodiment, when the $SO_x$ removal rate of the $SO_x$ trap material becomes the predetermined removal rate judgment value or less or when the concentration of the $SO_x$ which flows into the $SO_x$ trap material becomes the predetermined concentration judgment value or more, it is possible to make the lubrication oil which flows through the main flow path flow to the secondary flow path to make it run through the removal device.

FIG. 13 shows a flow chart of control of an exhaust purification system of an internal combustion engine in the present embodiment. The operational control in the present embodiment can be performed every predetermined time period. Step 101 to step 107 are similar to the control in the first embodiment (see FIG. 4). It is judged if the $SO_x$ removal rate of the $SO_x$ trap material is the predetermined removal rate judgment value or less.

Next, it is judged if the concentration of the $SO_x$ which flows into the $SO_x$ trap material becomes the predetermined concentration judgment value or more. At step 120, the content of the sulfur constituent which is contained in the lubrication oil is detected. In the present embodiment, a sulfur concentration sensor 29 which is arranged in the oil pan 55 is used to detect the content of the sulfur constituent of the lubrication oil. When the sulfur constituent which is contained in the lubrication oil is large in amount, the amount of $SO_x$ which is mixed in the exhaust gas also becomes greater. If the amount of $SO_x$ which is contained in the exhaust gas becomes greater, the $SO_x$ removal rate falls.

The detection of the content of the sulfur constituent which is contained in the lubrication oil is not limited to this embodiment. Any method may be used for detection. For example, when replacing the lubrication oil, a passenger or worker may store this in the electronic control unit by manual input.

At step 121, it is judged if the content C of the sulfur constituent which is contained in the lubrication oil is the content judgment value $C_H$ or more. When the content C of the sulfur constituent which is contained in the lubrication oil is the predetermined content judgment value $C_H$ or more, the routine proceeds to step 123. When the content C of the sulfur constituent which is contained in the lubrication oil is less than the content judgment value $C_H$, the routine proceeds to step 122.

In this case, in the judgments from step 101 to step 121, when the $SO_x$ removal rate of the $SO_x$ trap material is greater than the predetermined removal rate judgment value and when the concentration of the $SO_x$ which flows into the $SO_x$ trap material becomes less than the predetermined concentration judgment value, the routine proceeds to step 122.

At step 122, the flow of the secondary flow path 79 is cut. In the present embodiment, the switching valve 77 is switched to close the secondary flow path 79. Control is performed so that the lubrication oil does not flow to the sulfur constituent removal device 85. If the secondary flow path 79 is already closed, this state is continued. The lubrication oil runs through the main flow path 78.

As opposed to this, in the judgments from step 101 to step 121, when the $SO_x$ removal rate of the $SO_x$ trap material becomes the predetermined removal rate judgment value or less or when the concentration of the $SO_x$ which flows into the $SO_x$ trap material becomes the predetermined concentration judgment value or more, the routine proceeds to step 123.

At step 123, the secondary flow path is opened. In the present embodiment, the switching valve 77 is switched to switch the flow of the lubrication oil from the side heading toward the main flow path 78 to the side heading toward the secondary flow path 79. If the secondary flow path 79 is already open, this state is continued. The lubrication oil flows into the secondary flow path 79. The lubrication oil runs through the sulfur constituent removal device 85 whereby the sulfur constituent is removed.

The lubrication oil from which the sulfur constituent has been removed passes through the main oil hall 86, connecting rod 58, etc. to be supplied to the cylinder walls 91. The lubrication oil which is supplied to the cylinder walls 91 is reduced in sulfur constituent, so it is possible to reduce the $SO_x$ which is formed in the combustion chambers 2. As a result, it is possible to reduce the amount of $SO_x$ which flows into the $SO_x$ trap catalyst 16. The outflow of $SO_x$ from the $SO_x$ trap catalyst 16 can therefore be suppressed.

Further, the $SO_x$ trap catalyst can no longer store $SO_x$ when the $SO_x$ stored amount reaches a saturation level. Further, when the $SO_x$ stored amount approaches the saturation level, the amount of $SO_x$ which flows out from the $SO_x$ trap catalyst is increased. In such a case, it is possible to make lubrication oil run through the removal device to remove the sulfur constituent from the lubrication oil. Control may be performed to run lubrication oil through the removal device when the $SO_x$ stored amount of the $SO_x$ trap catalyst is a predetermined stored amount judgment value or more.

In the present embodiment, the secondary flow path bypassing the main flow path is arranged between the oil pan and the main oil hall and the removal device is arranged in this secondary flow path, but the invention is not limited to this embodiment. The secondary flow path may be formed at any position of the main flow path for feed from the oil pan to the cylinder walls.

The switching valve in the present embodiment is formed to switch between the main flow path and the secondary flow path, but the invention is not limited to this embodiment. It may also be formed so that the flow rate of the lubrication oil flowing into the secondary flow path can be adjusted. It is also possible to make at least part of the lubrication oil which flows through the main flow path flow into the secondary flow path for circulation to the removal device. For example, it is also possible to estimate the $SO_x$ removal rate and to use the estimated $SO_x$ removal rate and a removal rate judgment value as the basis to determine the flow rate of lubrication oil to run through the removal device. Alternatively, it is also possible to estimate the concentration of the $SO_x$ flowing to the $SO_x$ trap catalyst and use the estimated concentration of the $SO_x$ and a concentration judgment value as the basis to determine the flow rate of lubrication oil to run through the removal device.

The rest of the configuration, the action, and the effects are similar to the first and second embodiments, so here the explanations will not be repeated.

Fourth Embodiment

Figure 14:
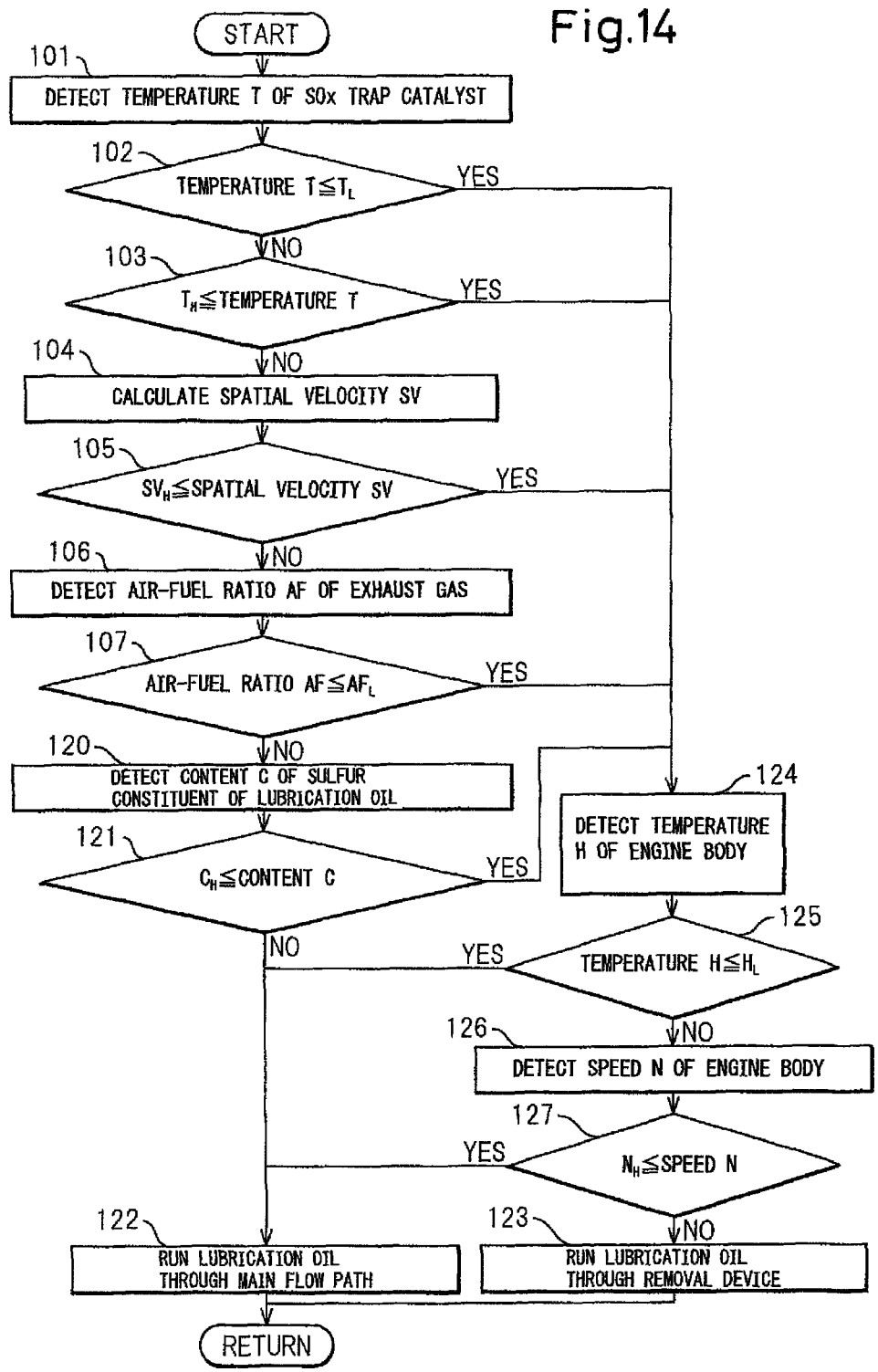
FIG. 14 is a flow chart of operational control of an exhaust purification system in a fourth embodiment.

Referring to FIG. 11 and FIG. 14, an exhaust purification system of an internal combustion engine according to a fourth embodiment will be explained. The configuration of the internal combustion engine in the present embodiment is similar to that of the third embodiment (see FIG. 11).

FIG. 14 shows a flow chart of operational control of the exhaust purification system in the present embodiment. The operational control in the present embodiment can be performed every predetermined time period. Step 101 to step 107, step 120, and step 121 are similar to the operational control in the second embodiment. In the operational control of the present embodiment, when the lubrication performance demanded in components of the engine body is high, control is performed to close the secondary flow path. That is, control is performed so that lubrication oil does not flow to the sulfur constituent removal device.

In the judgment up to step 101 to step 107, step 120, and step 121, when the $SO_x$ removal rate of the $SO_x$ trap material becomes the predetermined removal rate judgment value or less or when the concentration of the $SO_x$ which flows into the $SO_x$ trap material becomes the predetermined concentration judgment value or more, the routine proceeds to step 124.

At step 124, the temperature of the engine body 1 is detected. The temperature of the engine body 1 can be detected by a temperature sensor 25 arranged at an upstream side of the $SO_x$ trap catalyst 16. Alternatively, if the engine body 1 is stopped, it is also possible to use an outside air temperature sensor 43 to detect the temperature of the outside air, then estimate the temperature of the engine body 1.

Next, at step 125, it is judged if the temperature of the engine body H is a temperature judgment value $H_L$ or less. If the temperature of the engine body H is the temperature judgment value $H_L$ or less, the routine proceeds to step 122 where the secondary flow path is closed. The lubrication oil is run through the main flow path. If the lubrication oil is already being run through the main flow path, this state is maintained. For example, when the engine body is started up at cold areas etc., sometimes the temperature of the engine body is less than 0° C. If starting up the engine body 1 in this state, a high lubrication performance is demanded at the components of the engine body. In this case, control is performance so that the lubrication oil does not pass through the sulfur constituent removal device. Control is performed so that the sulfur constituent is not removed from the lubrication oil. When, at step 125, the temperature of the engine body is larger than the temperature judgment value $H_L$, the routine proceeds to step 126.

At step 126, the speed of the engine body N is detected. The speed of the engine body N can be detected based on the output signal of the crank angle sensor 42.

At step 127, it is judged if the speed of the engine body N is the speed judgment value $N_H$ or more. If the speed of the engine body N is the speed judgment value $N_H$ or more, the routine proceeds to step 122 where the secondary flow path is closed. Lubrication oil is made to run through to the main flow path. The internal combustion engine will sometimes be operating under a high load. For example, when climbing a sharp slope etc., the speed of the engine body is high. A high lubrication performance is demanded at the components of the engine body. In this case, control is performed so that the lubrication oil does not run through the sulfur constituent removal device. Control is performed so that the sulfur constituent is not removed from the lubrication oil. When, at step 127, the speed of the engine body N is smaller than the speed judgment value $N_H$, the routine proceeds to step 123.

At step 123, lubrication oil is run through the removal device. The secondary flow path is opened. In the present embodiment, the flow path through which the lubrication oil flows is switched from the main flow path side to the secondary flow path side. When lubrication oil is already running through the secondary flow path, this state is maintained.

The exhaust purification system of an internal combustion engine in the present embodiment can prevent a drop in the lubrication performance by the lubrication oil when lubrication performance is demanded in the engine body. The components of engine body can be kept from declining in performance or being damaged.

In the internal combustion engine of the present embodiment, when for example the internal combustion engine is started up in a cold location, the temperature of the engine body 1 is extremely low, so the secondary flow path is closed by the judgment of step 102 and step 125. Control is performed so that the sulfur constituent is not removed. When the engine body starts up and the temperature rises, the temperature of the $SO_x$ trap catalyst also rises. When the temperature T of the $SO_x$ trap catalyst is the low temperature judgment value $T_L$ or less, the secondary flow path is opened by the judgment of step 102. Lubrication oil is run through the sulfur constituent removal device. If the normal operating state continues and the temperature T of the $SO_x$ trap catalyst becomes larger than the low temperature judgment value $T_L$, the secondary flow path is closed by the judgment of step 102. In this case, it is possible to remove the sulfur constituent in accordance with the operating state.

At step 125, in addition to the judgment of the speed of the engine body, it is also possible to have the continuous time of operation at the speed judgment value or more added to the judgment. When operating the engine over a long period at a speed of a predetermined speed or more, a high lubrication performance is demanded. In such a case, it is possible to avoid removal of the sulfur constituent which is contained in the lubrication oil and possible to maintain the lubrication performance on components by the lubrication oil.

Further, in the present embodiment, when a high lubrication performance is demanded in the engine body, the flow to the sulfur constituent removal device is cut, but the invention is not limited to this embodiment. It is also possible to perform control to reduce the flow rate of the lubrication oil flowing to the removal device. For example, it is also possible to calculate a flow rate of lubrication oil for being run to the removal device in accordance with a detected temperature of the engine body and speed of the engine body and perform control to reduce the flow rate of lubrication oil for being run to the removal device.

The rest of the configuration, the action, and the effects are similar to the first to third embodiments, so here the explanations will not be repeated.

The above embodiments may be suitably combined. For example, it is possible to arrange sulfur constituent removal devices at both of the fuel flow path and lubrication oil flow path. In the above figures, the same or corresponding parts are assigned the same reference notations. Note that the above embodiments are illustrations and do not limit the invention. Further, the embodiments include changes shown in the claims.

REFERENCE SIGNS LIST 1 engine body
2 combustion chamber
3 fuel injector
16 $SO_x$ trap material
17 $NO_x$ storage reduction catalyst
30 electronic control unit
65 lubrication oil
70 removal device
73 switching valve
74 main flow path
75 secondary flow path
77 switching valve
78 main flow path
79 secondary flow path
85 removal device

The invention claimed is:

1. An exhaust purification system of an internal combustion engine which is provided with
an $NO_x$ storage reduction catalyst which is arranged in an engine exhaust passage, which stores $NO_x$ which is contained in exhaust gas when an air-fuel ratio of inflowing exhaust gas is lean, and which releases stored $NO_x$ when the air-fuel ratio of the inflowing exhaust gas becomes a stoichiometric air-fuel ratio or rich and
an $SO_x$ trap material which is arranged in the engine exhaust passage upstream of the $NO_x$ storage reduction catalyst and which removes $SO_x$ which is contained in the exhaust gas, wherein,
a main flow path which feeds fuel to combustion chambers of the engine body has connected to it a secondary flow path which bypasses the main flow path, while the secondary flow path has arranged in it a removal device which removes the sulfur constituent which is contained in the fuel and has arranged in it a opening and closing device which opens and closes the secondary flow path, and
when an $SO_x$ removal rate of the $SO_x$ trap material becomes a predetermined removal rate judgment value or less or when a concentration of the $SO_x$ which flows into the $SO_x$ trap material becomes a predetermined concentration judgment value or more, at least part of the fuel which flows through the main flow path is made to flow into the secondary flow path and run through the removal device, and
the case when an $SO_x$ removal rate of the $SO_x$ trap material becomes a predetermined removal rate judgment value or less includes at least one case of a case when a temperature of the $SO_x$ trap material becomes a low temperature side predetermined low temperature judgment value or less, a case when a temperature of the $SO_x$ trap material becomes a high temperature side predetermined high temperature judgment value or more, a case when an air-fuel ratio of the exhaust gas which flows into the $SO_x$ trap material becomes a predetermined air-fuel ratio judgment value or less, a case when a spatial velocity of the exhaust gas which flows into the $SO_x$ trap material becomes a predetermined velocity judgment value or more, and a case when an $SO_x$ stored amount of the $SO_x$ trap material becomes a predetermined stored amount judgment value or more.

2. An exhaust purification system of an internal combustion engine as set forth in claim 1, wherein the case when a concentration of the $SO_x$ which flows into the $SO_x$ trap material becomes a predetermined concentration judgment value or more includes a case when a content of a sulfur constituent which is contained in the fuel which is fed to the combustion chambers is a predetermined content judgment value or more.

3. An exhaust purification system of an internal combustion engine as set forth in claim 1, wherein the secondary flow path is closed when the lubrication performance which is demanded by a fuel injector which injects fuel into a combustion chamber becomes high.

4. An exhaust purification system of an internal combustion engine as set forth in claim 3, wherein the case when the lubrication performance which is demanded by a fuel injector which injects fuel into a combustion chamber becomes high includes at least one of a case when an injection frequency of fuel in one fuel cycle is a predetermined injection frequency judgment value or more and a case when an injection pressure of fuel from the fuel injector is a predetermined pressure judgment value or more.

5. An exhaust purification system of an internal combustion engine which is provided with
- an $NO_x$ storage reduction catalyst which is arranged in an engine exhaust passage, which stores $NO_x$ which is contained in exhaust gas when an air-fuel ratio of inflowing exhaust gas is lean, and which releases stored $NO_x$ when an air-fuel ratio of the inflowing exhaust gas becomes a stoichiometric air-fuel ratio or rich and
- an $SO_x$ trap material which is arranged in the engine exhaust passage upstream of the $NO_x$ storage reduction catalyst and which removes $SO_x$ which is contained in the exhaust gas, wherein,
- in the engine body, a main flow path which circulates lubrication oil of the engine body has connected to it a secondary flow path which bypasses the main flow path, while the secondary flow path has arranged in it a removal device which removes the sulfur constituent which is contained in the lubrication oil and has arranged in it a opening and closing device which opens and closes the secondary flow path, and
- when an $SO_x$ removal rate of the $SO_x$ trap material becomes a predetermined removal rate judgment value or less or when a concentration of the $SO_x$ which flows into the $SO_x$ trap material becomes a predetermined concentration judgment value or more, at least part of the lubrication oil which flows through the main flow path is made to flow into the secondary flow path and run through the removal device.

6. An exhaust purification system of an internal combustion engine as set forth in claim 5, wherein the case when the $SO_x$ removal rate of the $SO_x$ trap material becomes the predetermined removal rate judgment value or less includes at least one case of a case when a temperature of the $SO_x$ trap material becomes a low temperature side predetermined low temperature judgment value or less, a case when a temperature of the $SO_x$ trap material becomes a high temperature side predetermined high temperature judgment value or more, a case when an air-fuel ratio of the exhaust gas which flows into the $SO_x$ trap material becomes a predetermined air-fuel ratio judgment value or less, a case when a spatial velocity of the exhaust gas which flows into the $SO_x$ trap material becomes a predetermined velocity judgment value or more, and a case when an $SO_x$ stored amount of the $SO_x$ trap material becomes a predetermined stored amount judgment value or more.

7. An exhaust purification system of an internal combustion engine as set forth in claim 5, wherein the case when a concentration of the $SO_x$ which flows into the $SO_x$ trap material becomes a predetermined concentration judgment value or more includes a case when a content of the sulfur constituent which is contained in the lubrication oil becomes a predetermined content judgment value or more.

8. An exhaust purification system of an internal combustion engine as set forth in claim 5, wherein the secondary flow path is closed when a lubrication performance demanded in a component of the engine body becomes high.

9. An exhaust purification system of an internal combustion engine as set forth in claim 8, wherein the case when a lubrication performance demanded in a component of the engine body becomes high includes at least one of a case where a speed of the engine body becomes a predetermined speed judgment value or more and a case where a temperature of the engine body becomes at predetermined temperature judgment value or less.

* * * * *